Figure 1:
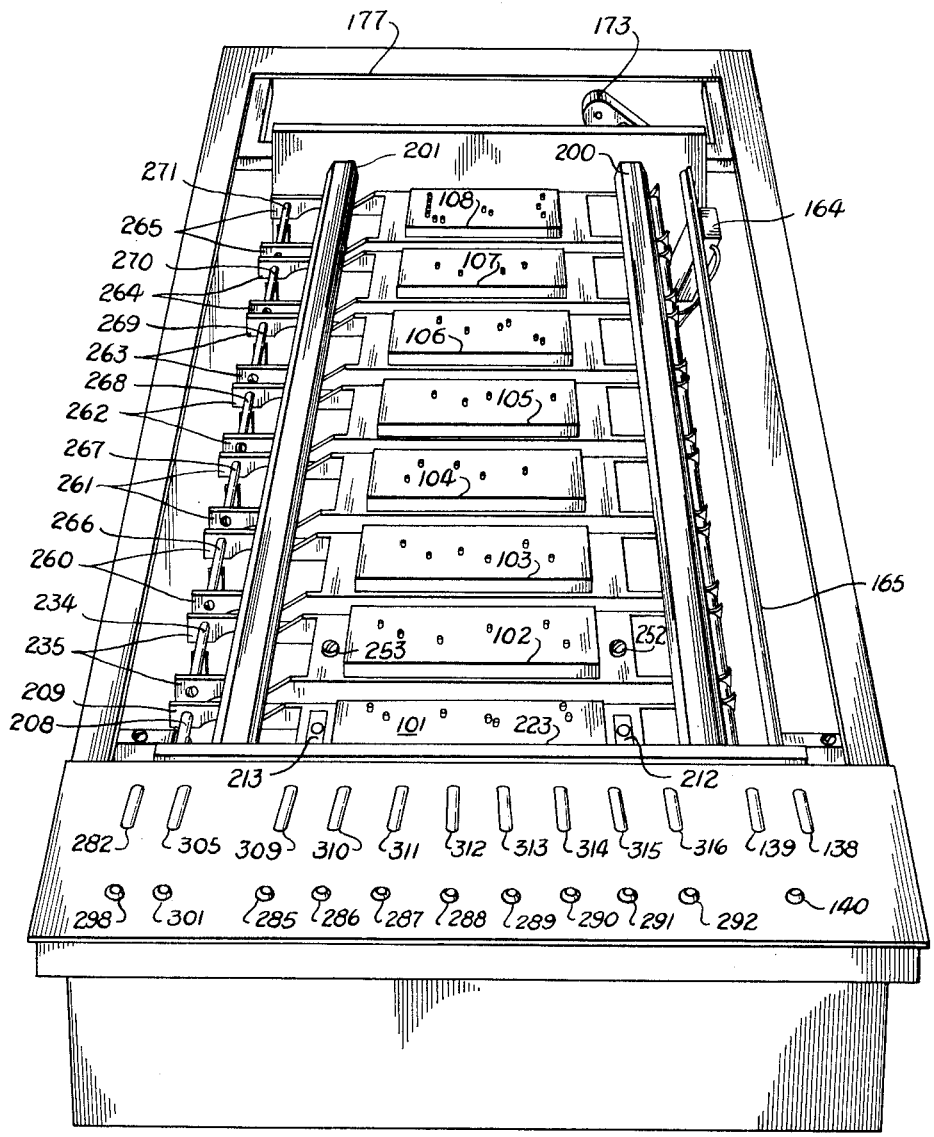

Jan. 26, 1965  A. A. BERLINSKY ETAL  3,167,244
AUTOMATIC OR MANUAL MULTIPLE PROGRAMMER
Filed July 3, 1961  16 Sheets-Sheet 1

INVENTORS
Anthony A. Berlinsky
Martin J. Brennan
BY
ATTORNEY

INVENTORS
Anthony A. Berlinsky
Martin J. Brennan
BY
ATTORNEY

Jan. 26, 1965   A. A. BERLINSKY ETAL   3,167,244
AUTOMATIC OR MANUAL MULTIPLE PROGRAMMER
Filed July 3, 1961   16 Sheets-Sheet 3
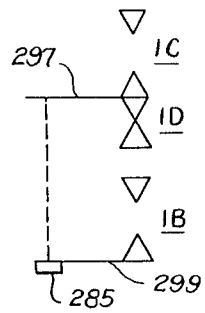
Fig. 4A
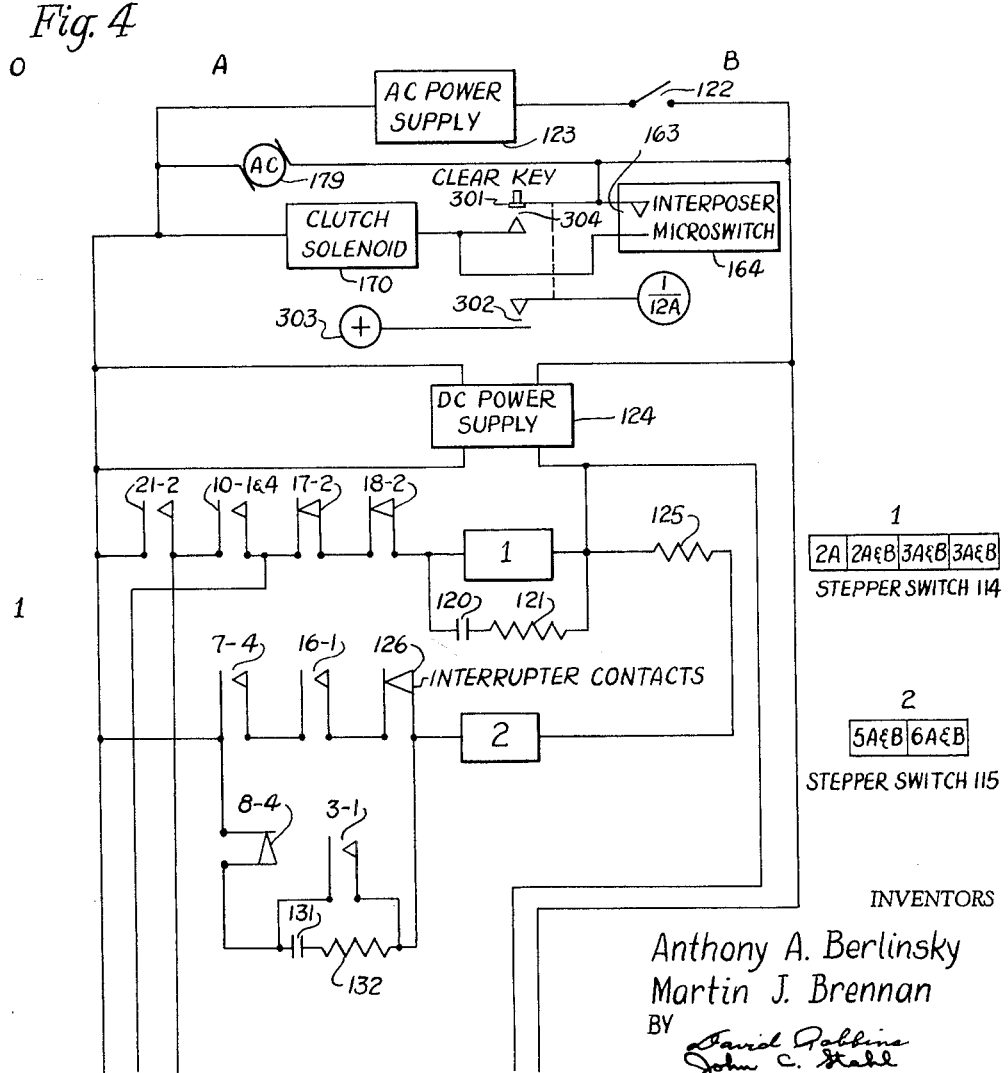
INVENTORS
Anthony A. Berlinsky
Martin J. Brennan
BY
ATTORNEY

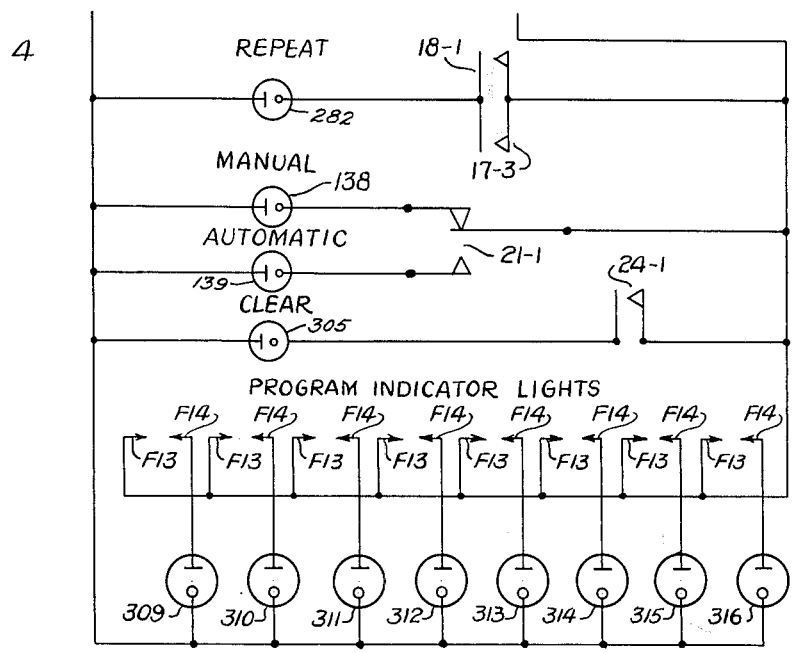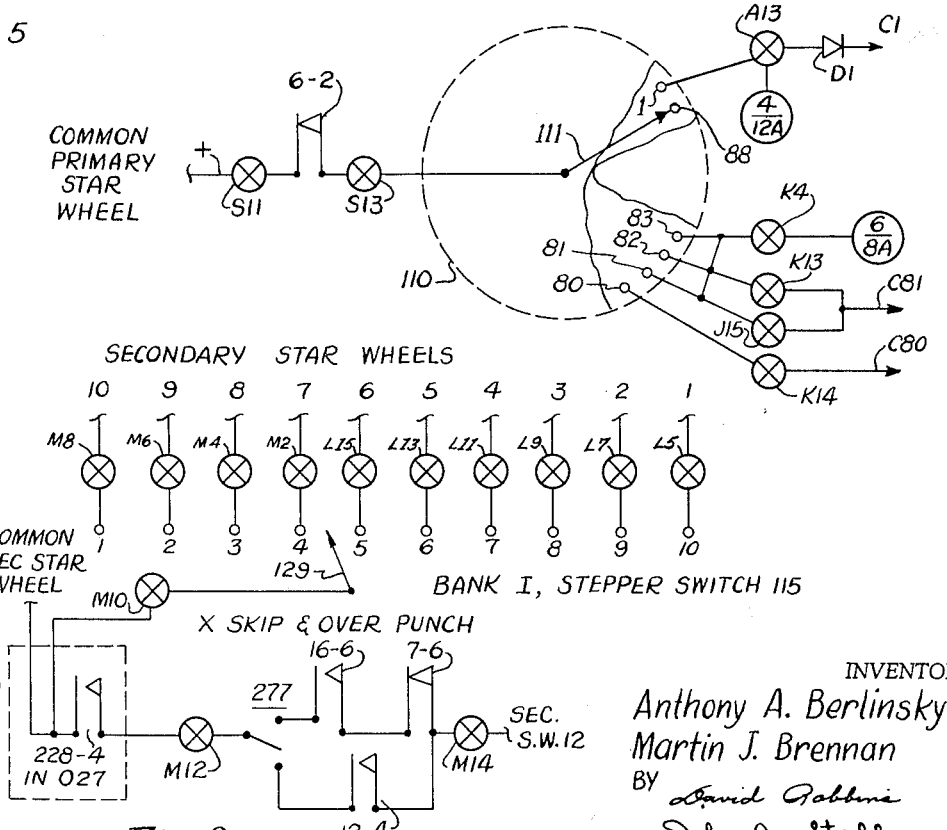
Fig. 6
INVENTORS
Anthony A. Berlinsky
Martin J. Brennan

Jan. 26, 1965  A. A. BERLINSKY ETAL  3,167,244
AUTOMATIC OR MANUAL MULTIPLE PROGRAMMER
Filed July 3, 1961  16 Sheets-Sheet 6
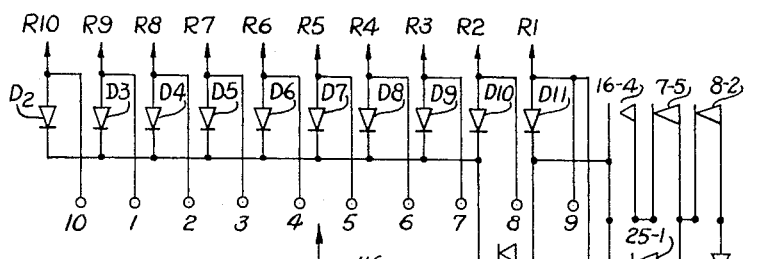
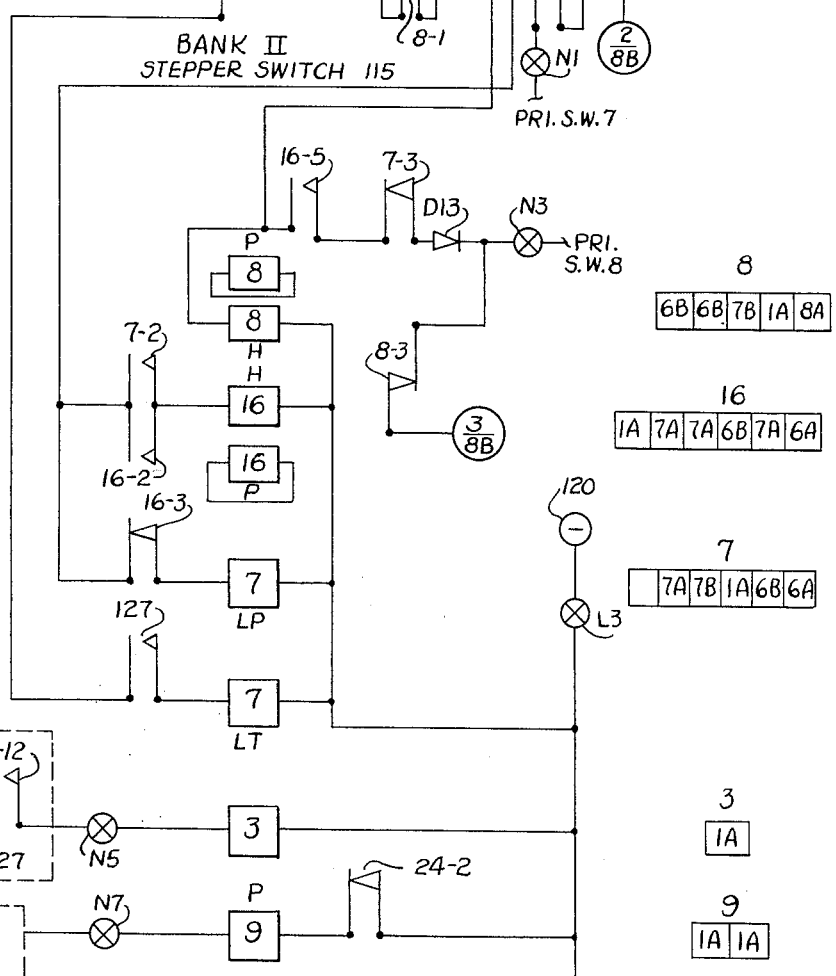
Fig. 7
INVENTORS
Anthony A. Berlinsky
Martin J. Brennan
BY
ATTORNEY

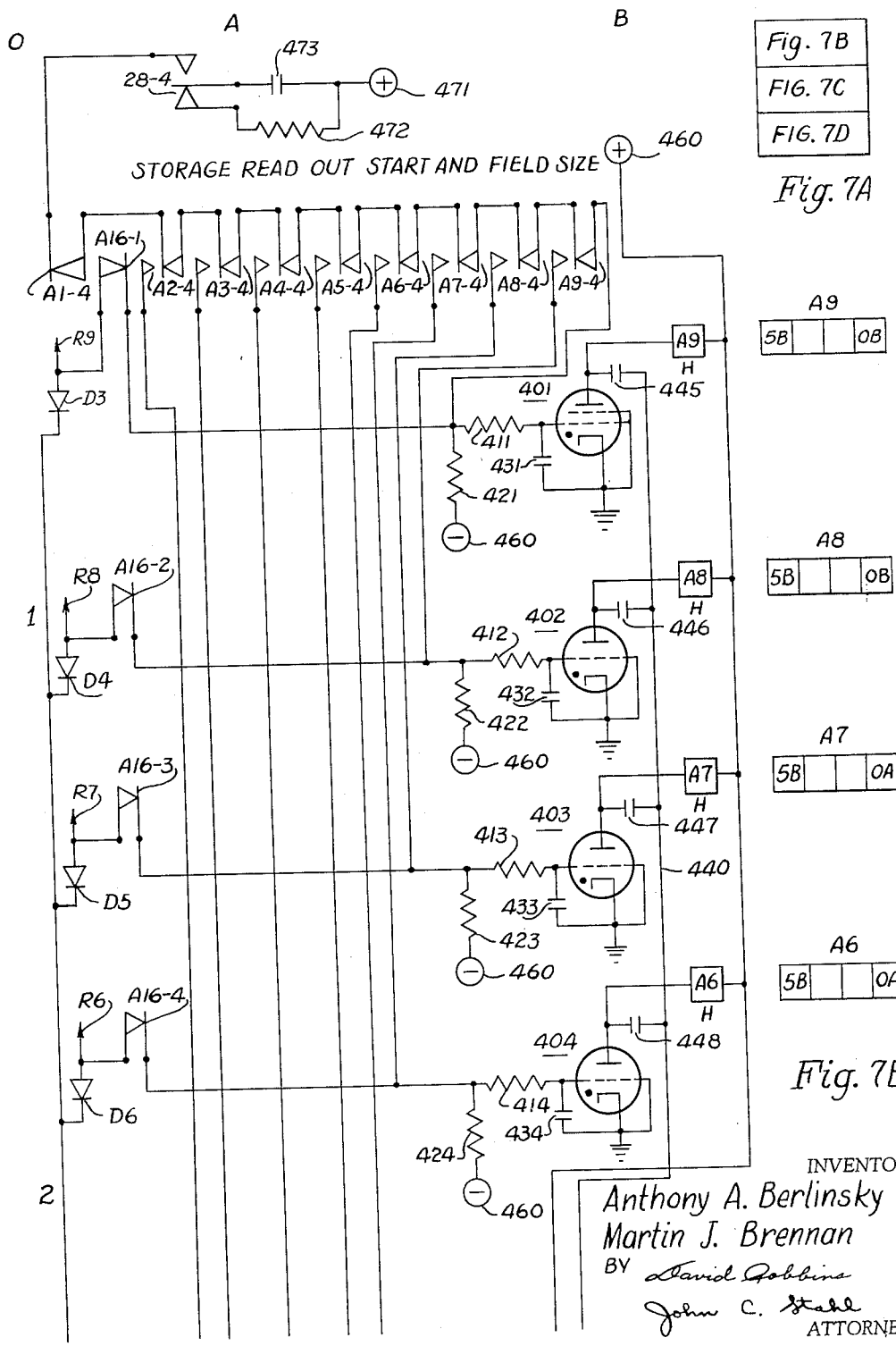

INVENTORS
Anthony A. Berlinsky
Martin J. Brennan
BY
ATTORNEY

INVENTORS
Anthony A. Berlinsky
Martin J. Brennan
BY
ATTORNEY

Fig. 10

SOLENOID 151, UNENERGIZED;
PROGRAM CONNECTOR 101, DISENGAGED

SOLENOID 151, UNENERGIZED;
PROGRAM CONNECTOR 101, ENGAGED

SOLENOID 152, ENERGIZED;
PROGRAM CONNECTOR 102, ENGAGED

SOLENOID 152, ENERGIZED;
PROGRAM CONNECTOR 102, DISENGAGED

INVENTORS
Anthony A. Berlinsky
Martin J. Brennan
BY
ATTORNEY

INVENTORS
Anthony A. Berlinsky
Martin J. Brennan
ATTORNEY

United States Patent Office 3,167,244
Patented Jan. 26, 1965

3,167,244
AUTOMATIC OR MANUAL MULTIPLE PROGRAMMER
Anthony A. Berlinsky, Silver Spring, and Martin J. Brennan, Maryland Park, Md., assignors to the United States of America as represented by the Secretary of Commerce
Filed July 3, 1961, Ser. No. 127,429
25 Claims. (Cl. 234—15)

This invention relates to a programmer and in particular to one for controlling a key punch machine in such a manner that information may be sequentially punched into a plurality of cards, each having the same or a different field pattern.

In one code used to punch information in a card, the position of a perforation in a vertical column indicates the value of a digit. The field or area on a card allotted to a category of information is therefore determined by the number of digits necessary to record the information.

When information, taken in sequence from printed material, is recorded in several cards, with present equipment, it is necessary either to provide all the cards with identical field patterns or reroute the material through the machine several times. Making the field patterns identical has the disadvantage that columns are wasted. For example, five columns will be lost when on the first card columns 1 to 10 are used to record a category of information, and on the second card only the first five columns are required to record another category. The number of columns wasted is multiplied many times when several cards are used and field sizes vary considerably. If the cards are provided with different field patterns, the printed material must be routed through the machine several times, increasing the time required to record the information.

Accordingly, a principal object of this invention is to provide a device that will call for the program required by the field pattern of each card as information is recorded in sequence in a plurality of cards.

This is accomplished by wiring the terminals of each female member of several program connectors to a set of circuits that control a machine in performing various operations. The male member of each connector has several groups of terminals wired together as desired in programming operations, which are performed by the machine when a male and female member engage. The connectors may be engaged either automatically or manually, as desired.

Although the embodiments disclosed control a key punch machine, it is understood that the principle of the invention may be used in a programmer for any one of a wide variety of machines.

Figure 2:
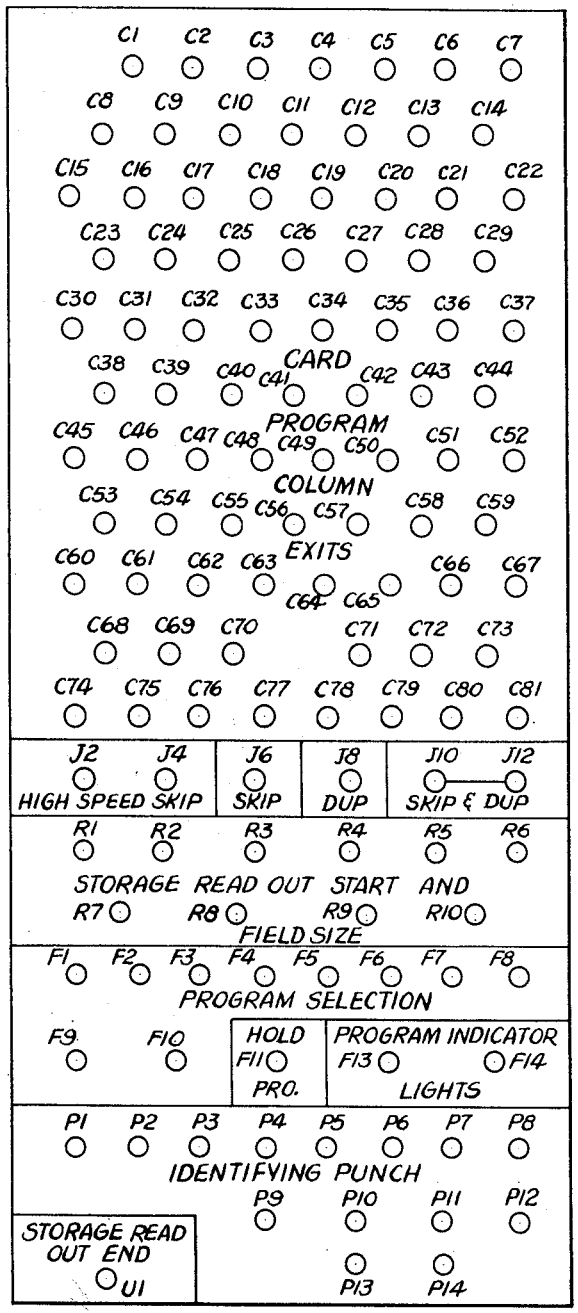
Figure 7C:
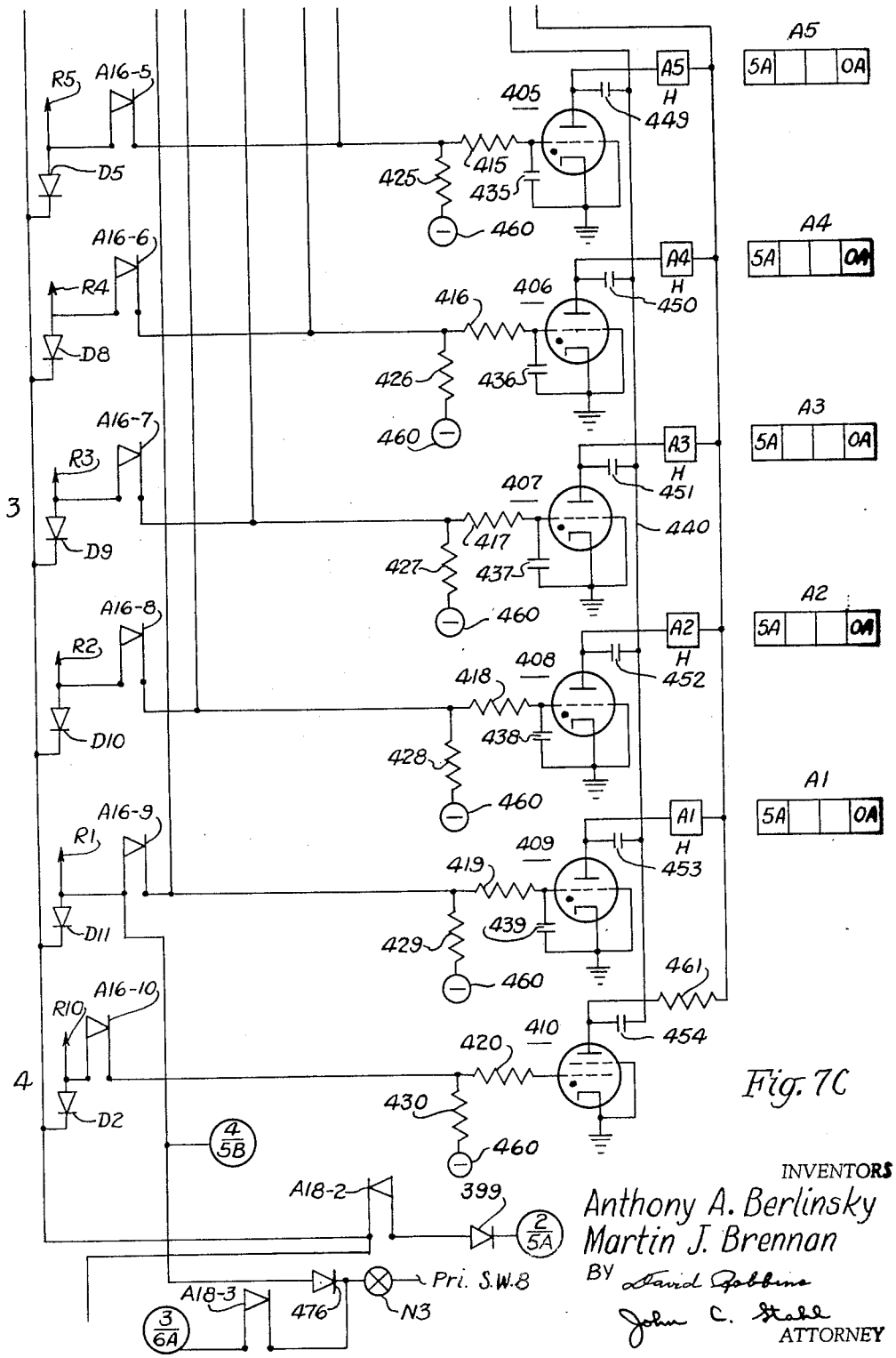
Figure 7D:
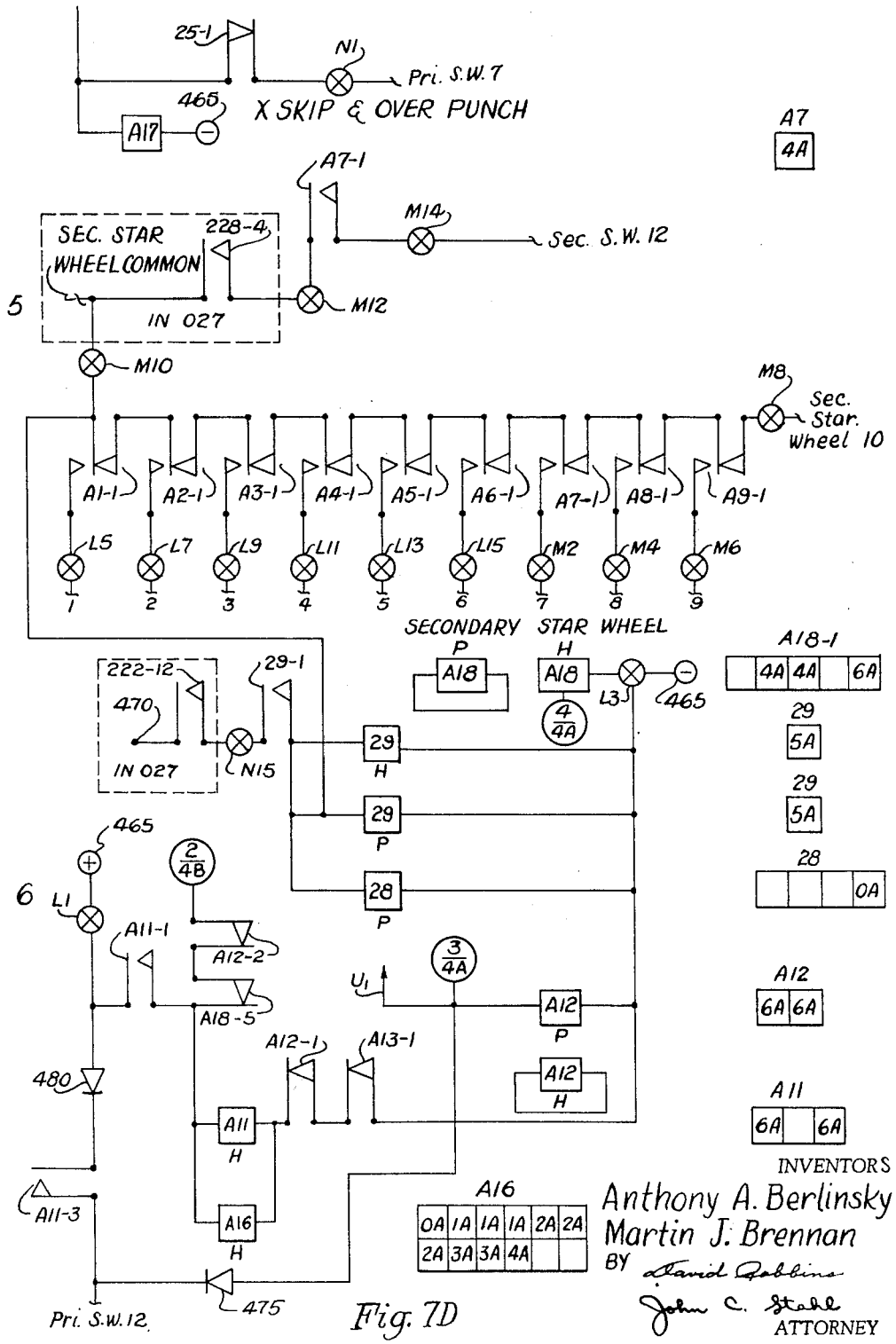

In the figures:
FIG. 1 is a perspective of the programmer disclosed;
FIG. 2 is a plan of a program card;
FIG. 3 is a block diagram illustrating the manner in which FIGS. 4 to 9 are assembled;
FIGS. 4 to 9 show a first embodiment of the electrical circuits of the programmer;
FIG. 4A is a detail drawing of one of the switches of the interconnected group of switches shown in FIG. 4;
FIG. 7A is a block diagram illustrating the manner in which FIGS. 7B to 7D are assembled;
FIGS. 7B and 7D show a second embodiment of the electrical circuits of the programmer;
FIG. 10 shows the field patterns in the face of two cards in which information may be recorded;
FIGS. 11 to 14A disclose side views of a program connector and an arrangement for controlling the interposers on which the connector is mounted; and
FIG. 15 is a side view of the programmer disclosed.

Before considering the drawings, the system of notation employed will be described. When FIGS. 4 to 9 are arranged as shown in FIG. 3, it will be noted that numbers ranging from 0 to 13 appear in the left-hand margin and letters A and B appear along the top, FIG. 4, of the composite drawing. This forms a coordinate system which may be conveniently used to locate the contacts of the relays and the banks of the stepper switches located in the figures. For example, coil 6 is associated with rectangle 6, FIG. 5, which is divided into sections marked 3A, 5A, 1B representing contacts 6-1, 6-2, 6-3, or contacts 1 to 3 of relay 6, respectively. Since the notation in each section represents the location of the associated contact in the figures, to use the notation 3A to locate contacts 6-1, find the area between numbers 3 and 4 in the left-hand margin of FIG. 5 and proceed to the A or left-hand portion of this area. The same procedure may be followed to locate the banks of stepper switches 114 and 115. All contacts are shown in the position occupied when their associated relays are released.

Every relay and relay coil is represented by a rectangle. When a relay coil has a P nearby, it is a pick coil which has a comparatively low resistance, is energized quickly and is used for operations that are not to be maintained for a long period of time. When a relay coil has H nearby, it is a hold coil which has a higher resistance and is used where the circuit is to be held for an appreciable length of time. Finally, when a coil is denominated by a number and LP, and another coil by the same number and LT, if the former is energized it latches an armature closing relay contacts; if the latter is energized, it releases that armature, opening the relay contacts.

It will be observed that some of the terminals in the figures are represented by the number of the terminal over a coordinate, for example $$\frac{1}{12A}$$

This denotes that terminal 1 is connected to a terminal marked 1 over a coordinate, which may be found at 12A. Some connectors are represented by an X inside a circle and a number, e.g., $\otimes_{S11}$ to indicate that connector S11 is located between the programmer disclosed and the machine being controlled. Finally, a lead ending in an arrow indicates that the lead is connected to a terminal located on a female member, e.g., member 223 in FIGS. 1, 11, of one of the program connectors 101 to 108 in FIG. 1. The number of the terminal is located near the arrow.

In the description below, by way of illustration, the programmer disclosed controls IBM Key Punch Machine 027. Hence, the structure shown in FIGS. 4 to 9 and 7D enclosed in a dotted rectangle and marked "in 027" is located in that machine.

With the programmer to be described, it is possible to operate the IBM machine under the control of one of eight different programs, which may be selected manually or automatically. Each of these programs is determined by the wiring on the face of a program card 109 located on one of the male members of program connectors 101 to 108 in FIG. 1. The plan of one of these program cards is shown in detail in FIG. 2.

Emitter 110, FIG. 6, which keeps the programmer in the present embodiment in step with the card being punched, is located on a gear train of IBM machine 027 that controls the card movement through the machine. The emitter has 88 terminals, but for simplicity, only terminals 1, 80 to 83 and 88 are shown. Each time the card is stepped one position by the IBM machine, wiper arm 111 of the emitter is advanced one terminal. Each terminal 1 to 80 on emitter 110 is connected to a respective one of terminals C1 to C80 on program card 109 in the area marked "CARD PROGRAM COLUMN EXITS" so that each of the latter terminals corresponds to a column 1 to 80 on the card to be punched.

When wiper arm 111 engages terminal 1 and column 1 of the card is in position to be punched, a circuit is completed from the common primary star wheel in IBM machine 027, which provides a positive potential, through connector S11, contacts 6–2, the wiper arm, terminal 1, connector A13, diode D1 to terminal C1 on the program card. Similar circuits are completed when wiper arm 111 engages one of the terminals 2 to 81 placing positive potential on one of the terminals C2 to C81.

FIELD SIZE AND RECORDING IN A FIELD

To establish a desired field size, the terminal C1 to C80 on program card 109, corresponding to the column starting the field, is connected to one of the terminals R1 to R10 in the area of the card entitled "STORAGE READ-OUT START AND FIELD SIZE." The terminal C1 to C80, corresponding to the column ending the field, is wired to terminal U1 in the area marked "STORAGE READ-OUT END."

In the description that follows, two embodiments for establishing a desired field size and recording in a field will be presented.

First embodiment

Figure 8:
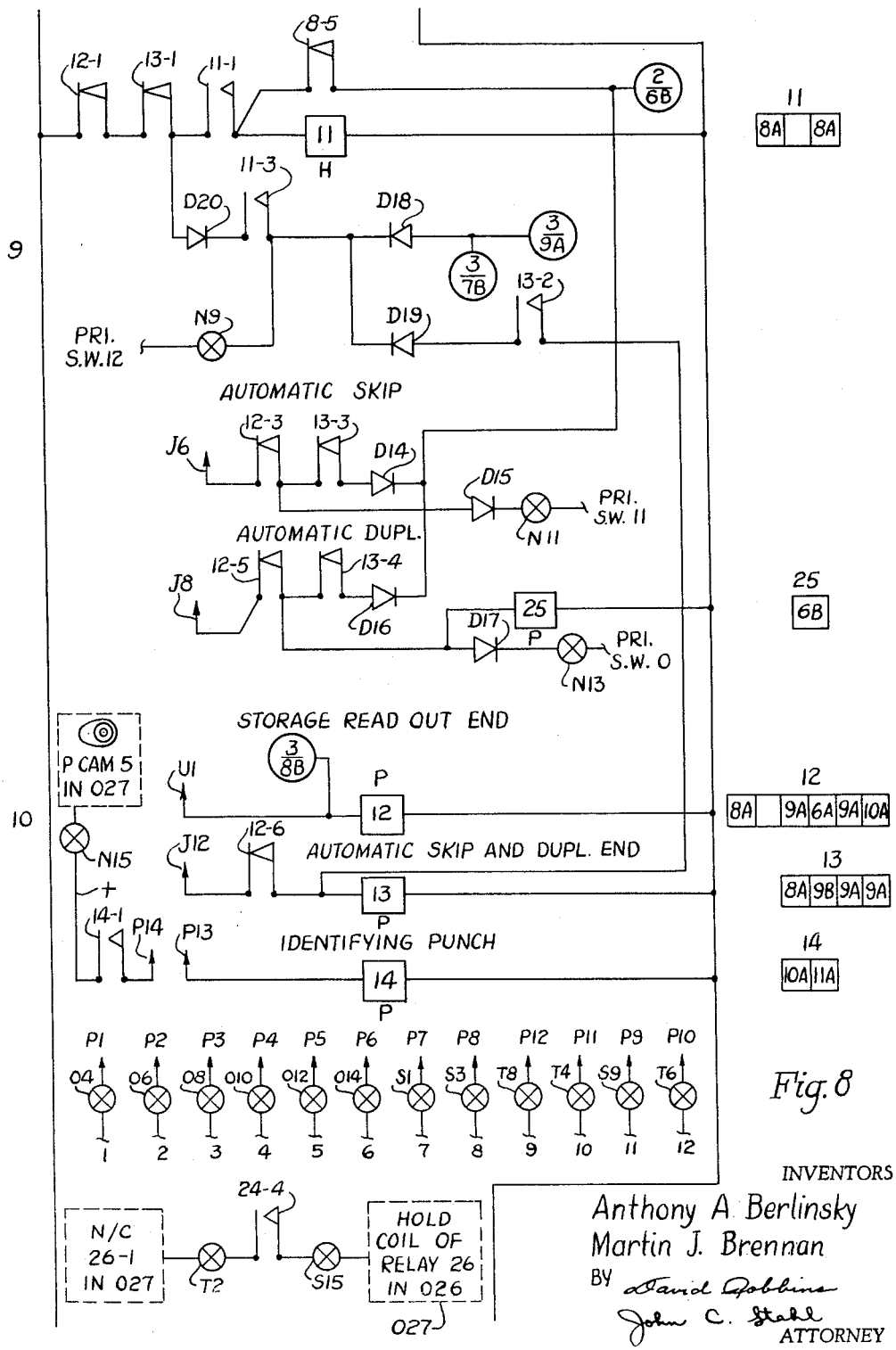

In this embodiment, shown in FIGS. 7 and 8, each of the terminals R1 to R10 is connected to the anode of a respective one of the diodes D2 to D11 in FIG. 7 and is also connected to a respective one of terminals 1 to 10, bank II of stepper switch 115, which are swept by wiper arm 116.

Referring to card 118, FIG. 10, since the first field on the left has ten columns, terminal C1 on program card 109 is tied to terminal R10, and terminals C10 and U1 are tied together. This establishes the start and termination of a field size having ten columns.

In operation, positive potential is applied from the common primary star wheel, FIG. 6, through emitter 110, diode D1, terminals C1, R10, diode D2, FIG. 7, and contacts 8–1 to the movable arm of contacts 16–4. Positive potential is also applied from the movable arm through contacts 16–3, relay coil 7LP and connector L3 to the negative terminal of power supply 120, energizing coil 7LP. Contacts 7–2 close to energize relay coil 16H through an obvious circuit so that contacts 16–2 are closed and contacts 16–3 are opened, leaving the armature of coil 7LP in the latched position and coil 16H energized. Contacts 16–4 are then closed, contacts 7–5 are opened and positive potential appears on the movable arm of contacts 7–5.

Referring to FIG. 4, when switch 122 is closed, the output of A.C. power supply 123 is applied to D.C. power supply 124. When coil 16H is energized, the armature of coil 7LP is latched and switch 122 is closed, a circuit is completed from one output terminal of D.C. power supply 124 through resistor 125, coil 2, interrupter contacts 126, contacts 16–1, 7–4 to the other output terminal of the power supply, energizing coil 2. The armature of the coil is then pulled, opening interrupter contacts 126. This breaks the circuit through the coil and releases its armature. The interrupter contacts are then closed, re-energizing coil 2. Each time the armature is pulled, a ratchet on stepper switch 115 is cocked so that when the armature is released wiper arm 116 is advanced one contact of bank II.

As coil 2 is energized and relased, contacts 127, FIG. 7, located on stepper switch 115, are opened and closed so that when wiper arm 116 engages terminal 10 of bank II, positive potential is applied through contacts 127 to energize relay coil 7LT. Contacts 7–4 are then opened, breaking the circuit through coil 2. Since this occurs when wiper arm 116 is on terminal 10, when coil 2 is released, wiper arm 116 moves to terminal 1, coming to rest there. Simultaneously, wiper arm 129 comes to rest on terminal 1, bank I of stepper switch 115.

Each of terminals 1 to 10 of bank I, switch 115 is tied to a respective one of secondary star wheels 1 to 10 in IBM machine 027 through one of the connectors M8, M6, M4, M2, L15, L13, L11, L9, L7, and L5.

When relay coil 7LT is energized, as described immediately above, contacts 7–5 are closed and positive potential is applied through contacts 25–1 and connector N1 to primary star wheel 7 in IBM machine 027. Positive potential applied to this primary star wheel fulfills one of the requirements for transferring the information stored in the key storage unit to the punch storage unit in the IBM machine.

When positive potential is placed on primary star wheel 7, contacts 222–12, FIG. 7, in the IBM machine are closed.

After the desired information is stored in the key storage unit, the add or subtract bar on the keyboard is depressed to transfer the information to the punch storage unit in the IBM machine and set in motion cam 6, not shown. As the cam rotates, it closes a set of contacts applying source of positive potential 130 through contacts 222–12 in FIG. 7, connector N5, and relay 3 to the negative terminal of power source 120, thereby energizing relay 3 for 81° of the 360° cycle of the cam. Capacitor 131 and resistor 132 in FIG. 4, connected across contacts 3–1, form an arc suppression circuit.

When relay 3 is energized, contacts 3–1 complete an obvious circuit through coil 2 of stepper switch 115 once for each column in the field to be punched, as will now be described. The positive potential on contacts 7–5 is applied through contacts 8–2, diode D12, terminals $$\frac{2}{8B}$$

$$\frac{2}{6B}$$

contacts 8–5 and relay coil 11H to the negative terminal of power source 120, thereby closing contacts 11–1 to establish a holding circuit for relay coil 11H through contacts 12–1, 13–1, and 11–1. Potential is also applied from the positive terminal of power source 120 through connector L1, contacts 12–1, 13–1, diode D20, contacts 11–3 to primary star wheel 12. As long as positive potential appears on primary star wheel 12, cam 6 will continue to rotate.

As cam 6 rotates, circuits are closed which allow card 118 to progress colmun-by-column through IBM machine 027.

Emitter 110 is stepped each time the card is advanced. Since each of the terminals 1 to 81 on the emitter is connected to a respective one of the terminals C1 to C81 on program card 109, as wiper arm 111 advances from terminal to terminal, positive potential is applied from the common primary star wheel in FIG. 6 to each of terminals C1 to C10. When positive potential is applied to terminal C10, because of the interconnection previously mentioned, it is also applied to terminal U1. Hence, positive potential is applied through terminal U1 and relay coil 12P, FIG. 8, to the negative terminal of power supply 120, energizing coil 12P. When this coil is energized, contacts 12–1 are opened, breaking the holding circuit for relay coil 11H. Contacts 12–1, when opened, also break the circuit through diode D20 and contacts 11–3 to primary star wheel 12. Simultaneously, positive potential is applied from terminal U1 through terminals $$\frac{3}{8B}$$

$$\frac{3}{9A}$$

diode D18 to primary star wheel 12. Wiper arm 111, therefore, will not stop on terminal 10 but will proceed to terminal 11 so that the instruction waiting on terminal C11, program card 109, may be executed.

Now the punching operation performed by IBM machine 027 will be described. It will be recalled that at the start of the ten-column field in card 118, wiper arm 129 of bank I, stepper switch 115 rested on terminal 1. As the stepper switch is activated in the manner indicated above, and card 118 is advanced column-by-column through IBM machine 027, wiper arm 129 engages a different one of terminals 1 to 10 for each column of card 118 and completes a circuit from the common secondary star wheel through connector M10 to one of the secondary star wheels 1 to 10 for each card column. Circuits are thereby completed in the IBM machine that record in columns 1 to 10 the information stored in the punch storage unit.

To reset the punch storage unit, positive potential is applied from terminal U1 through terminals $$\frac{3}{8B}$$

$$\frac{3}{9A}$$

$$\frac{3}{7B}$$

$$\frac{3}{8B}$$

contacts 8–3, connector N3 to primary star wheel 8 in FIG. 7. Positive potential applied to this star wheel effects the desired resetting operation.

*Second embodiment*

This embodiment is disclosed in FIGS. 7B to 7D when assembled as shown in FIG. 7A.

Each terminal R1 to R10 on program card 109 is wired to a respective anode of diodes D2 to D11, each cathode is connected by way of contacts A18–2 to the anode of diode 399. Each terminal R1 to R10 is also connected to the control grid of a respective thyratron 401 to 410 through one of the contacts A16–1 to A16–10 and one of the resistors 411 to 420. One side of each resistor 411 to 420 is connected through one of resistors 421 to 430 to a negative terminal of power source 460, while the other side of each resistor 411 to 419 is connected through one of the capacitors 431 to 439 to ground with respect to the same power source. The plate of each thyratron 401 to 409 is tied to wire 440 through one of capacitors 445 to 453 and to a positive terminal of source 460 through one of relays A1H to A9H. The plate of thyratron 410 is tied to wire 440 through capacitor 454 and to the positive terminal of source 460 through resistor 461. The cathode of each thyratron is connected to ground with respect to power source 460.

As an example, if a field comprising the first nine columns of card 118 is to be established, terminal C1 on program card 109 is wired to terminal R9 and terminals C9 and U1 are tied together.

In operation, when the wiper arm of emitter 110 engages terminal 1 in FIG. 6, positive potential is applied through terminal R9, contacts A16–1 and resistor 411 to the control grid of thyratron 401, firing the thyratron. Positive potential is also applied through terminal R9, diode D3 in FIG. 7B, contacts A18–2, diode 399, terminals $$\frac{2}{5A}$$

$$\frac{2}{4B}$$

contacts A12–2, A18–5, relay coil A11H, contacts A12–1, 13–1, and connector L3 to the negative terminal of power source 465. Relay coil A11H is energized, closing contacts A11–1. A holding circuit is established for coil A11H that includes a positive terminal of power source 465 and contacts A11–1. At the same time, relay A16H is energized, opening contacts A16–1 to A16–10.

It is noted that contacts 13–1 in FIG. 7D are controlled by relay coil 13P in FIG. 8, and contacts 25–1 in FIG. 7D by relay coil 25P in FIG. 8.

Positive potential is also applied from terminal R–9 through diode D3, contacts 25–1, and connector N1 to primary star wheel 7. Positive potential applied to this primary star wheel fulfills one of the requirements for transferring the information stored in the key storage unit to the punch storage unit of the IBM machine.

When positive potential is placed on primary star wheel 7, contacts 222–12, FIG. 7D, in the IBM machine are closed.

After the desired information is stored in the key storage unit, the add or subtract bar on the keyboard is depressed to transfer the information to the punch storage unit in the IBM machine and set in motion cam 6, not shown. As the cam rotates at 85° of its cycle, positive potential is applied through the secondary star wheel common, FIG. 7D, connector M10, relay coil 29P, connector L3 to the negative terminal of power source 465. Coil 29P is energized closing contacts 29–1. At 130° of the cam's cycle, positive potential is applied to terminal 470, and since contacts 222–12, 29–1 are closed, relay coils 28P, 29H are energized. These relays remain energized until 180° of the cam's cycle, when positive potential is no longer applied to terminal 470.

When relay coil 28P is energized, the movable arm of contacts 28–4 is transferred to the upper contact in FIG. 7B and potential is applied from a positive terminal of power source 471 through capacitor 473, contacts 28–4, and a circuit that includes contacts A1–4, A8–4, and A9–4 to the control grid of thyratron 402. Thyratron 402 fires, applying a negative pulse through capacitors 446, 445 to the plate of thyratron 401 which is then cut off. The sequence of events just described occurs during a punch-clutch cycle of the IBM machine.

Capacitor 473 is selected so that a pulse of proper duration is applied to the control grids of thyratrons 401 to 410. When relay 28P is released and the movable arm of contacts 28–4 is transferred to the lower contact in FIG. 7B, capacitor 473 is discharged through resistor 472.

During the next punch-clutch cycle, a similar sequence of events occurs and thyratron 403 is energized under the control of relay A8 and contacts A8–4, while thyratron 402 is cut off. Operation continues in this manner and thyratrons 404 to 409 are each in turn energized and de-energized under control of relays A7 to A1 and contacts A7–4 to A1–4 until thyratron 410 is energized. The latter corresponds to the last column in the field to be punched.

Potential is applied from the positive terminal of power source 465 in FIG. 7D through connector L1, diode 480, contacts A11–3 to primary star wheel 12. As long as positive potential appears on primary star wheel 12, cam 6 will continue to rotate. As the cam rotates, circuits are closed which allow the card 118 to progress column-by-column through the IBM machine.

Emitter 110 in FIG. 6 is stepped each time the card is advanced. Since each of the terminals 1 to 81 on the emitter is connected to a respective one of terminals C1 to C81 on program card 109, as wiper arm 111 advances from terminal-to-terminal, positive potential is applied from the common primary star wheel to each of the terminals C1 to C9. When positive potential is applied to terminal C9, because of the interconnection previously mentioned, it is also applied to terminal U1 in FIG. 7D. Hence, positive potential is applied through terminal U1 and relay coil A12P to the negative terminal of power supply 465, energizing coil A12P. When this coil is energized, contacts A12–1 are opened, breaking the holding circuit for relay coil A11. Simultaneously, positive potential is applied from terminal U1 through diode 475 to primary star wheel 12. Wiper arm 111 in FIG. 6 will, therefore, not stop on terminal 9 but will proceed to terminal 10 so that the instruction waiting on terminal C10, program card 109, may be executed. The terminals of relay coil A12H are wired together to delay the release of the armature associated with coils A12H and A12P.

Now, the punching operation performed by the IBM machine will be described. It will be recalled that at the start of the nine column field in card 118 in which information is to be recorded, thyratron 401 was energized. As each thyratron 401 to 410 is energized and de-energized in the manner indicated above, and card 118 is advanced column-by-column through the IBM machine, relays A9 to A1 are activated to close contacts A1–1 to A9–1, thereby completing circuits from the secondary star wheel common through connector M10 and one of the connectors L5, L7, L9, L11, L13, L15, M2, M4 or M6 to one of the secondary star wheels 1 to 9 for each card column. Circuits are thereby completed in the IBM machine that record in column 1 to 9 the information stored in the punch storage unit.

To reset the punch storage unit, positive potential is applied from terminal U1 through terminals $$\frac{3}{4A}$$

$$\frac{3}{6A}$$

contacts A18–3 and connector N3 to primary star wheel 8. Positive potential applied to this star wheel effects the desired resetting operation.

EIGHT AND SINGLE COLUMN FIELDS

To program the eight-column field for card 118, terminal C11 on program card 109 is tied to terminal R8, and terminal C18 to terminal U1. The operation of the programmer disclosed in this field is essentially the same as that just presented for the ten-column field and need not be described further.

To program a single-column field defined by column 19 on card 118, terminal C19 on program card 109 is tied to terminal R1. This is the only wiring that is required on the program card.

In operation, relay coils 16H, 7LP, 7LT in FIG. 7 are energized in the manner indicated above for the ten-column field to step wiper arm 116 to terminal 10, bank II and wiper arm 129 to terminal 10, bank I of switch 115. Simultaneously, relay 8H is energized through an obvious circuit to open contacts 8–2, 8–3 and 8–5. This prevents relay coil 11H, FIG. 8, from being energized and potential from being applied to primary star wheel 12 through terminals $$\frac{3}{8B}$$

$$\frac{3}{9A}$$

and diode D18. As a result, a single-column field is defined.

Positive potential is applied through terminals C19, R1, diode D11 in FIG. 7 and contacts 16–4, 7–5 and 25–1 to primary star wheel 7, conditioning the IBM machine so that information may be transferred from the key storage unit to the punch storage unit. Relay 8H, when energized, opens contacts 8–4, FIG. 4. Thus, when the add bar is depressed, stepper switch 115 is not advanced, but the information in the key storage unit in the IBM machine is transferred to the punch storage unit. Potential is applied from the common secondary star wheel through wiper arm 129 to terminal 10, bank I, switch 115 to record the information in key storage unit into column 19. Positive potential is also applied through contacts 16–5, 7–3, diode D13, FIG. 7, to primary star wheel 8, resetting the punch storage unit.

To establish the single-column field, defined by column 20 in card 118, terminal C20 is wired to terminal R1 on program card 109.

In the first embodiment, because of the operation just described, wiper arm 116 is already resting on terminal 10 of bank II, switch 115 while wiper arm 129 of bank I is resting on terminal 10, the required positions. The terminals of relay coil 8P are wired together as are the terminals of relay coil 16P, providing the coils 8H, 16P with a desired delay so that the coils will not be de-energized when card 118 is advanced to record information in column 20 and emitter 110 advances wiper arm 111 to terminal 20. Since positive potential is applied to primary star wheel 7, one of the requirements is fulfilled for transferring the information stored in the key storage unit to the punch storage unit in the IBM machine. Depressing the add bar, the operator may then record the information in column 20 in the manner described immediately above.

In the second embodiment in FIGS. 7C and 7D, positive potential is applied from terminal R1 through contacts A16–9 and resistor 419 to the control grid of thyratron 409, firing the thyratron. The positive potential on terminal R1 is also applied through terminals $$\frac{4}{5B}$$

$$\frac{4}{4A}$$

relay coil A18H to the negative terminal of power supply 465. Relay coil A18H is energized; contacts A18–2, A18–3, A18–5 open, preventing the application of positive potential through a circuit that includes terminals $$\frac{2}{5A}$$

$$\frac{2}{4B}$$

that would energize relay A11H and the application of positive potential through a circuit that includes terminals $$\frac{3}{6A}$$

and $$\frac{3}{4A}$$

that would energize relay A12P. The terminals of relay coil A18P are wired together to provide coil A18H with a desired delay in being de-energized.

Positive potential is applied from terminal R1 through contacts 25–1, connector N1 to primary star wheel 7. This fulfills one requirement for transferring the information stored in the key storage unit to the punch storage unit in the IBM machine. When thyratron 409 is fired, relay coil A1H is energized, the movable arm of contacts A1–1 is transferred to engage the terminal to the left in FIG. 7D so that a circuit is completed, when the operator depresses the add bar, that records information in column 20. See "Field Size and Recording in a Field, Second Embodiment," supra.

Positive potential, applied from terminal R1 through diode 476 to primary star wheel 8, effects the resetting of the key punch storage unit at a time of the punch-clutch cycle, occurring after the punching operation has been effected.

SINGLE-COLUMN SKIP

To effect an automatic skip of column 21, card 118, terminal C21 is wired to terminal J6 and to J10 or J12 in the areas marked "SKIP" and " SKIP AND DUPLICATION," respectively, on program card 109. The latter terminals are wired together.

In operation, positive potential is applied from terminal J6 through contacts 12–3, FIG. 8, diode 15, connector N11 to primary star wheel 11 in the IBM machine effecting the start of an automatic skip. Positive potential is applied from terminal J12 through contacts 12–6 and relay coil 13P, energizing the latter to open contacts 13–3. The potential on terminal J6 will not be applied through a circuit that includes relay coil 11H to the negative terminal of power source 120 so that coil 11H will not be activated. Relay coil 13P, when energized, also opens contacts 13–1 to prevent the establishment of a holding circuit for coil 11H. Once the IBM machine skips column 21, potential is no longer applied through terminal J6 to primary star wheel 11 and the automatic skip operation ceases.

IDENTIFYING PUNCH

In recording information, several card types may be used. It is therefore desirable to automatically punch a number into a particular column on each card to indicate the card type used, or more precisely, the field pattern used on the card.

Referring to FIGS. 2 and 8, each of the terminals P1 to P12 in the section of program card 109 labelled "IDENTIFYING PUNCH" is connected through one of connectors O4, O6, O8, O10, O12, O14, S1, S3, T8, T4, S9, T6 in FIG. 8 to a circuit 1 to 12 in IBM machine 027 that effects recording in one of the 12 rows in card 118. Circuits 1 to 9 effect recording in rows 1 to 9, respectively; circuit 10 in the O row; circuit 11 in the X row, located immediately above the O row; and circuit 12 in the V row, located above the X row. The X and V rows are not marked on the card.

If it is desired to automatically perforate column 22, row 1 of card 118 to indicate that card type 1 is being used, terminal C22 is wired to terminal P13 on program card 109 and terminal P14 is wired to terminal P1.

In operation, the positive potential applied to terminal P13 energizes relay coil 14P in FIG. 8 closing contact 14–1. During the desired time interval, P cam 5 in the IBM machine closes a circuit which applies positive potential through connector N15, contacts 14–1, terminals P14 and P1 to perforate column 22, row 1.

A punch-clutch cycle may be defined broadly as one revolution of the shaft on which the cams are located that control the interposers effecting a punching operation. Each time that there is a punch-clutch cycle, the card advances one column, except for the last punch-clutch cycle of a particular field. In operation, the relays that control the interposers for the punching operation are sensed one column before the punching operation is to occur. Therefore, as the card is being punched for one column the interposer relays are being sensed for the next column. Thus, when the punching operation is not effected by the interposers in the previous column, the sensing for the present column is lost and it is necessary to insert the dummy punch-clutch cycle to obtain the sensing operation.

Figure 9:
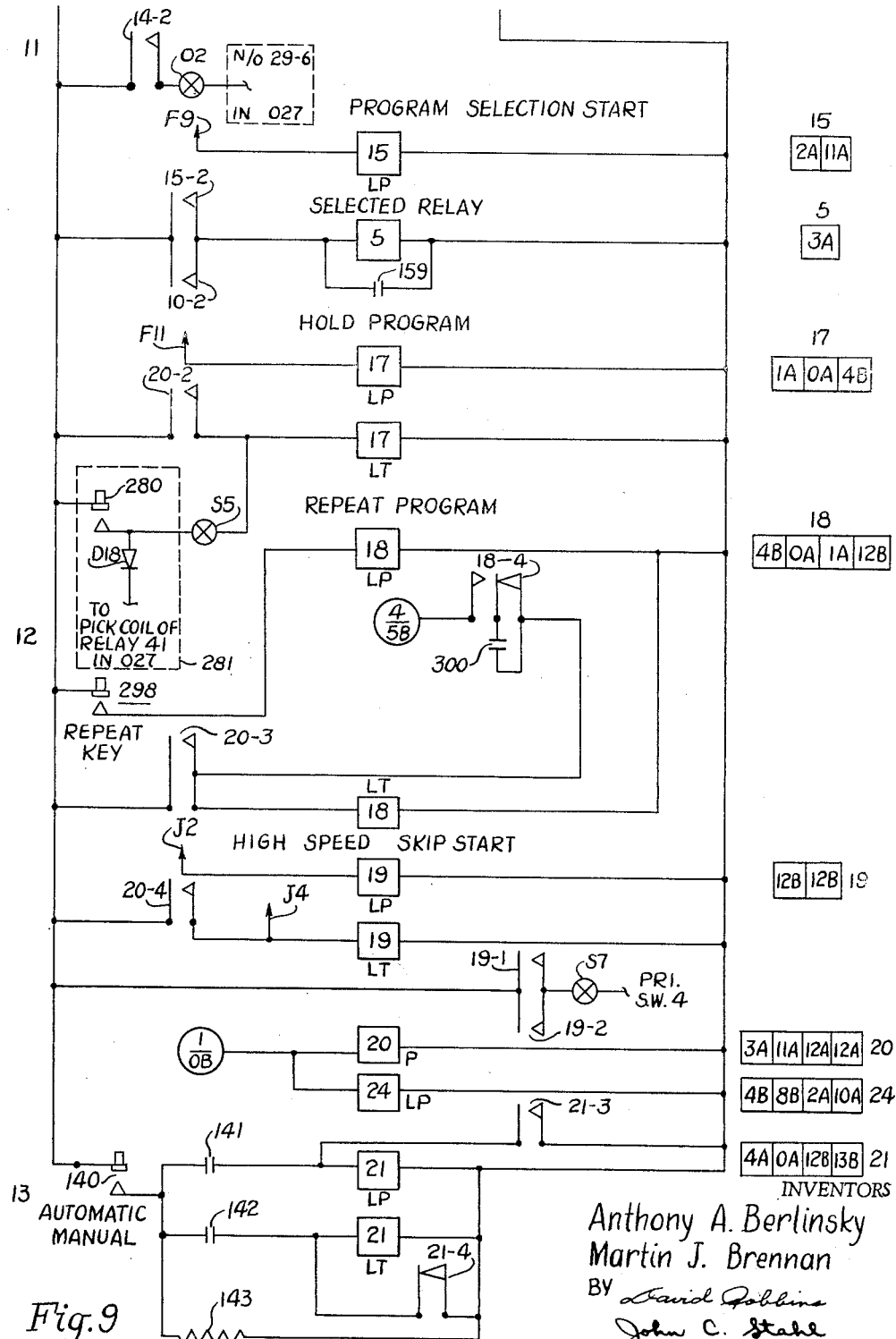

Therefore, contacts 14–2 close in FIG. 9, when relay coil 14 is energized, to provide IBM machine 027 with a dummy punch-clutch cycle. This is accomplished by completing a circuit from the positive terminal of power supply 120 through contacts 14–2, connector O2 to N/O (normally open) contacts 29–6 in the IBM machine.

AUTOMATIC SKIP

To effect an automatic skip between columns 23 and 80 on card 118, terminal C23 is wired to the terminal J6 on program card 109 and terminal C80 is wired to terminal J12.

In operation, positive potential is applied from terminal J6 through contacts 12–3, FIG. 8, diode D15 to primary star wheel 11 in the IBM machine to start the skipping operation. Positive potential is also applied from terminal J6 through contacts 12–3, 13–3, diode D14, contacts 8–5 and relay coil 11H to establish field definition. Coil 11 is held by a circuit established through contacts 12–1, 13–1 and 11–1. Positive potential is therefore applied to primary star wheel 12 through contacts 12–1, 13–1, diode D20 and contacts 11–3. This will continue the skipping operation in IBM machine 027 until the circuit to primary star wheel 12 is broken. When the card is advanced to column 80, positive potential is applied through terminal J12, contacts 12–6 to energize relay coil 13P, thereby opening contacts 13–1 to release coil 11H.

However, it is desired that the IBM machine advance to "column 81," the start of an imaginary time interval that can be represented by the time required by emitter 110 to step through "columns 81 to 88" which, of course, do not exist on card 118. During this time interval, the IBM machine registers a new card, i.e., places the next card into punching position. Since terminal C80 is wired to a terminal J12, positive potential is applied through the latter terminal, contacts 12–6, 13–2, and diode D19 to primary star wheel 12. This allows the field definition to continue through column 80 bringing the programmer to "column 81."

HIGH-SPEED SKIP

The IBM machine must be in a an automatic skip before the high-speed skip can be activated, and the high-speed skip must be stopped five columns ahead of the automatic skip so that the high-speed clutch in the IBM machine can be de-energized and the machine slowed down to automatic-skip speed before the skipping operation is terminated. This is accomplished in the present example by wiring terminal C24 to terminal J2, and terminal C75 to terminal J4 in the area of card 109 entitled "HIGH-SPEED SKIP."

In operation, positive potential is applied to terminal J2 to energize relay 19LP in FIG. 9. Contacts 19–1 and 19–2 are closed to apply positive potential through connector S7 to primary star wheel 4. This energizes the high-speed clutch in IBM machine 027. When the IBM machine reaches column 75, wiper arm 111 of emitter 110 is on terminal 75, not shown, so that positive potential is applied to the terminal at J4, energizing relay 19LT to break contacts 19–1, 19–2. Since positive potential is then no longer applied to primary star wheel 4, the high-speed clutch is deactivated and the IBM machine continues to column 80 in an automatic skip.

AUTOMATIC/MANUAL PROGRAM CHANGING

Referring to FIG. 9, when the programmer is in manual operation contacts 21–3 are open and contacts 21–4 are closed. When automatic/manual key 140 is depressed to place the programmer in automatic operation, current flows from the positive terminal of power source 120 through the key, condenser 141 and relay coil 21LP to the negative terminal of the power supply. Relay coil 21LP is energized and its armature latched; contacts 21–3 close, shorting coil 21LP, and contacts 21–4 open. The movable arm of contacts 21–1 engages the lower fixed contact to energize neon tube 139 in FIG. 6, indicating the programmer is in automatic operation. When the key is depressed again, placing the programmer in manual operation, current flows through condenser 142 to energize relay coil 21LT. The armature is released, contacts 21–3 open and contacts 21–4 close, shorting coil 21LT. The movable arm of contacts 21–1 engages the upper fixed contact, energizing neon tube 138 to indicate manual operation. Resistor 143, positioned across capacitor 141 and coil 21LP and across capacitor 142 and coil 21LT, bleeds current off the capacitors.

Assume that the programmer is in automatic operation and engaged program conector 101 is to be released while connector 102 is to be engaged. It is noted that terminals 81 to 83 of emitter 110 are tied together. As wiper arm 111 engages terminal 81, positive potential is applied through terminals $$\frac{6}{8A}$$

$$\frac{6}{5B}$$

relay coil 10P in FIG. 7 to energize the coil. Condenser 148 and resistor 149, connected across this relay, form an arc suppression circuit. Since relay 10P is energized and the armature of relay 21LP is latched, a circuit is completed in FIG. 4 that runs from one terminal of D.C. power supply 124, contacts 21-2, 10-1 and 4, 17-2, 18-2, coil 1 to the other terminal of the power supply. Coil 1 is energized, advancing wiper arm 150 from terminal 1 to terminal 2 of bank III, stepper switch 114.

Each of solenoids 151 to 158 is connected to a respective one of terminals 1 to 8 of bank III, switch 114 and is energized when it is desired to engage the male and female member of a respective one of program connectors 101 to 108, as will become apparent from the discussion below. Resistor 160 and capacitor 162, connected in series between wiper arm 150 and one side of each solenoid 151 to 158, form an arc suppression circuit. To ensure that wiper arm 150 is on the desired terminal of bank III, switch 114 before one of the solenoids is activated, when relay coil 10P is energized contacts 10-2 in FIG. 9 close and relay 5 is energized. Contacts 5-1 open so that none of the solenoids can be activated. When wiper arm 111 leaves terminal 83 of emitter 110, relay coil 10P is de-energized, opening contacts 10-2 to break the circuit through relay 5. Capacitor 159, connected across relay 5, provides the relay with a selected delay, after which it is de-energized, closing contacts 5-1. A circuit may then be completed through contacts 6-1, 5-1 and wiper arm 150 to activate the desired solenoid 151 to 158 when, as now will be indicated, relay 6 is energized.

During the interval of operation of IBM machine 027 reprsented by "column 87," the card feed coil in the machine is energized by a positive pulse thereby feeding a card from the hopper to the bed of the IBM machine. At the same time, if a card is present in the bed of the machine, it will be registered.

Figure 5:
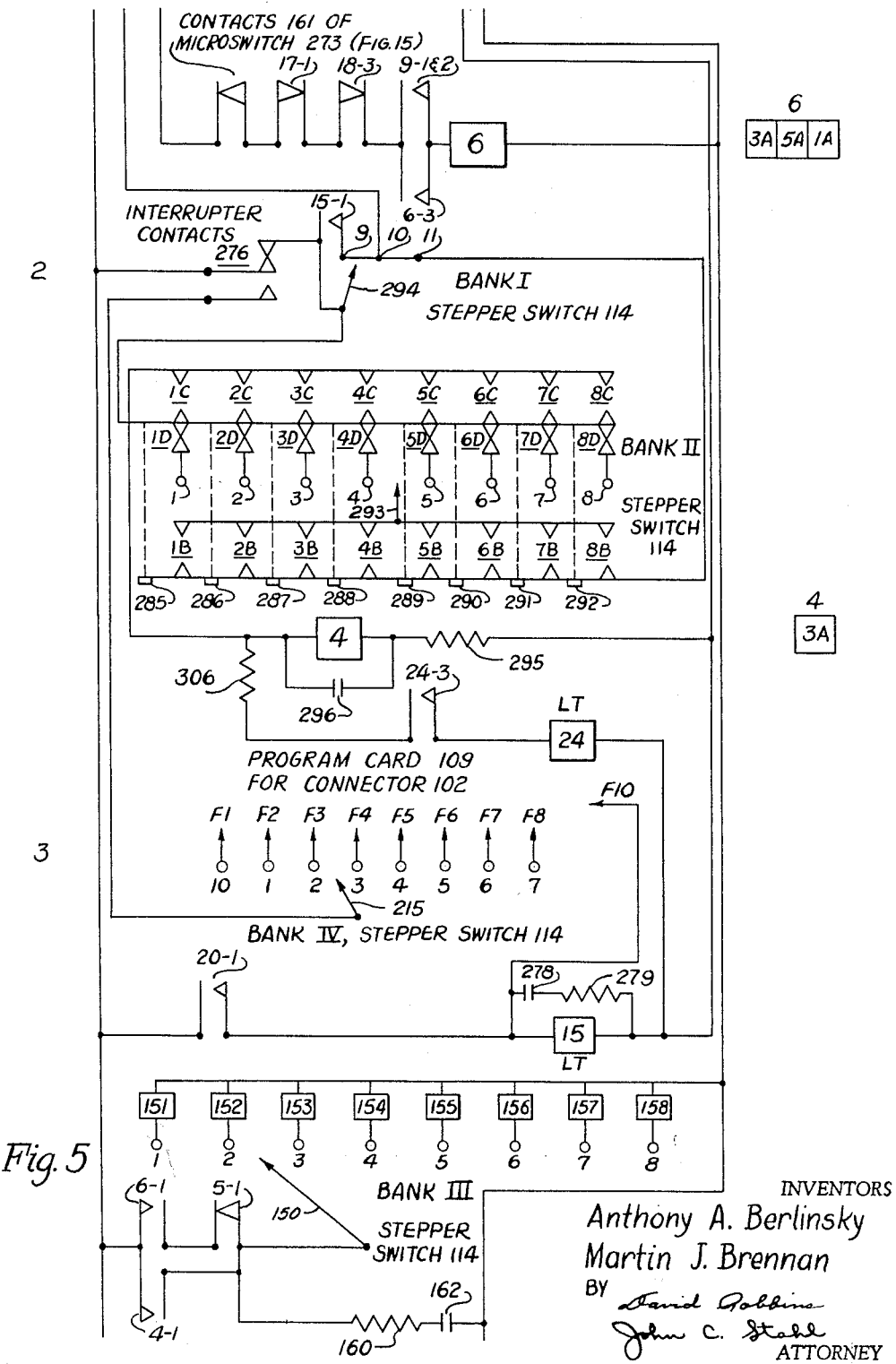

To synchronize the card feed with advancement of wiper arm 150, bank III of stepper switch 114, the positive pulse applied to the former is fed through connector N7, relay coil 9P in FIG. 7 and contacts 24-2 to the negative terminal of power supply 120, energizing coil 9P. Contacts 9-1 and 2 in FIG. 5 are then closed completing a circuit through relay 6 that runs from one terminal of A.C. power supply 123 through contacts 21-2, microswitch contacts 161, contacts 17-1, 18-3, 9-1 and 2, relay 6 to the other terminal of the power supply. This energizes relay 6, closing contacts 6-3 to complete a holding circuit for the relay and closing contacts 6-1 to complete a circuit from one side of A.C. power supply 123 through contacts 6-1, 5-1, wiper arm 150, terminal 2 of bank III of switch 114, solenoid 152 to the other side of the power supply. When solenoid 152 is energized program connector 101 is released; connector 102 is engaged; and microswitch contacts 161 are opened, breaking the circuit through coil 6, as will presently be described.

Figure 13:
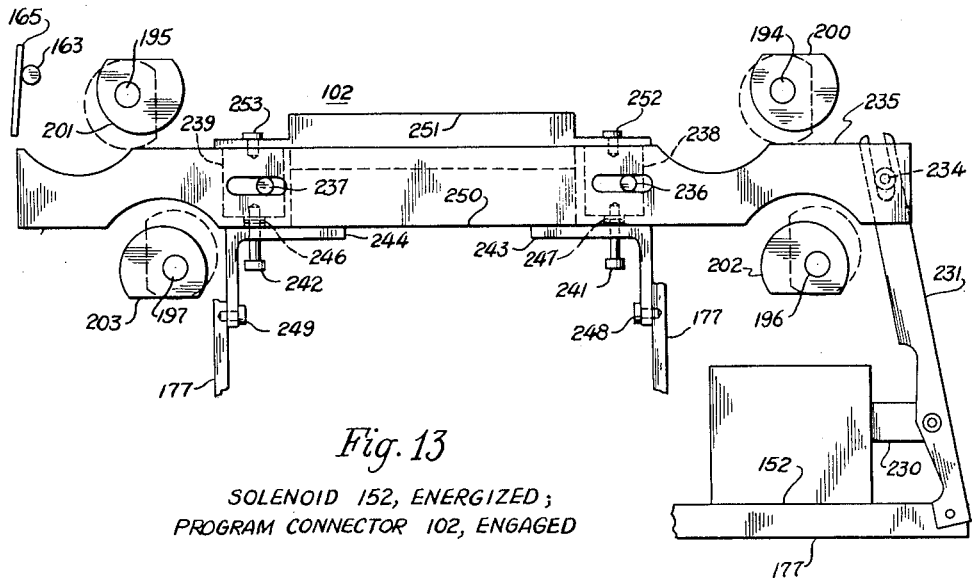
Figure 14:
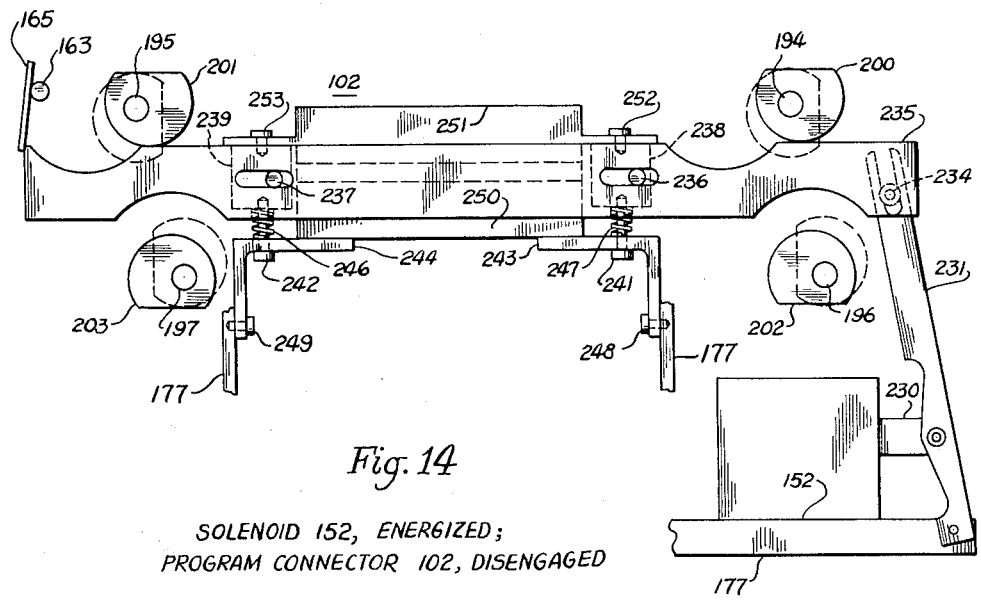
Figure 15:
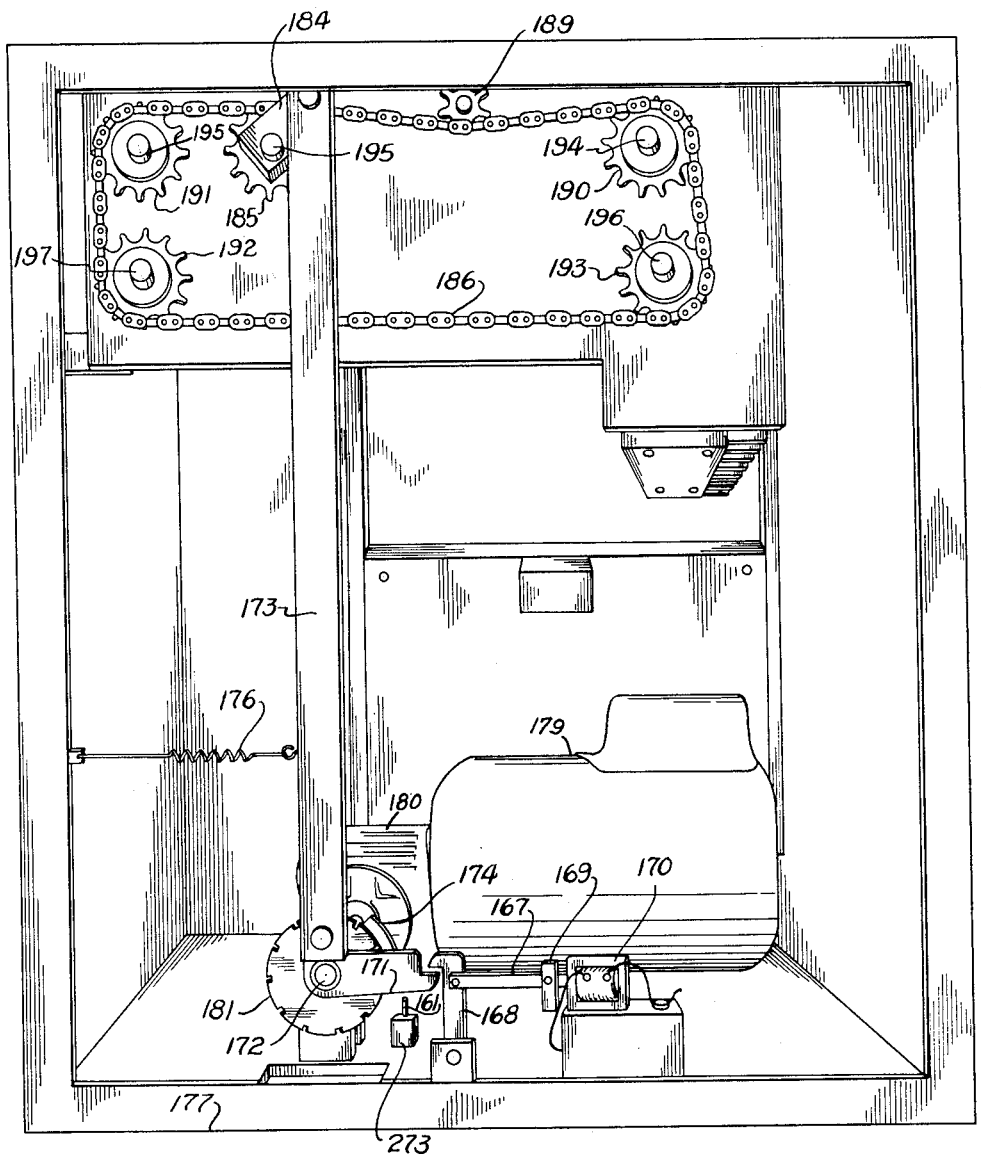

Referring to FIGS. 1, 4, 13, and 14, contacts 163 of interposer microswitch 164 are controlled by bar 165. When bar 165 is positioned as shown in FIG. 13, contacts 163 are open; when the bar is positioned as shown in FIG. 14, the contacts are closed.

Referring to FIG. 15, arm 167 is pivotally connected between latch arm 168 and plunger 169. The plunger is controlled by clutch solenoid 170. L-shaped arm 171 is mounted on shaft 172 but does not rotate with the shaft, while eccentric arm 173 and dog 174 are pivotally mounted on the L-shaped arm. Spring 176, attached between eccentric arm 173 and frame 177, urges L-shaped arm 171 against latch arm 168. A.C. motor 179, when energized, rotates shaft 172 through gear reduction box 180 so that disc 181, mounted on the shaft, is rotated counterclockwise. The A.C. motor is connected across power supply 123 when switch 122 is closed, as shown in FIG. 4. The upper end of eccentric arm 173 has member 184 pivotally attached thereto on which is mounted sprocket 185 which engages chain 186. Sprockets 189 to 193 engage the chain and each of sprockets 190 to 193 is mounted on a respective one of rods 194 to 197. Each of cams 200 to 203 in FIGS. 11 to 14 is also mounted on a respective one of the rods. The solid lines of cams 200 to 203 represent their normal position and the dotted lines their rotated position as they rotate back and forth under control of chain 186.

Figure 11:
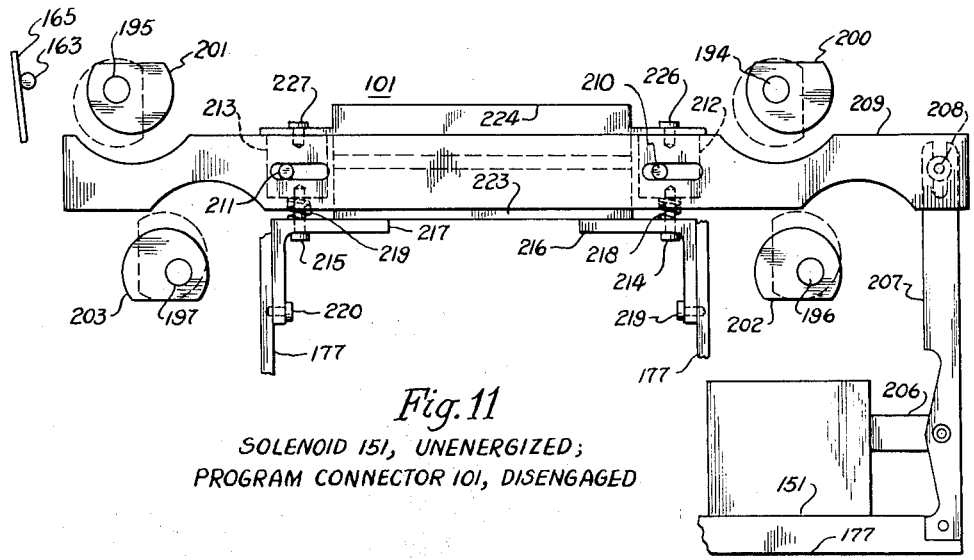
Figure 12:
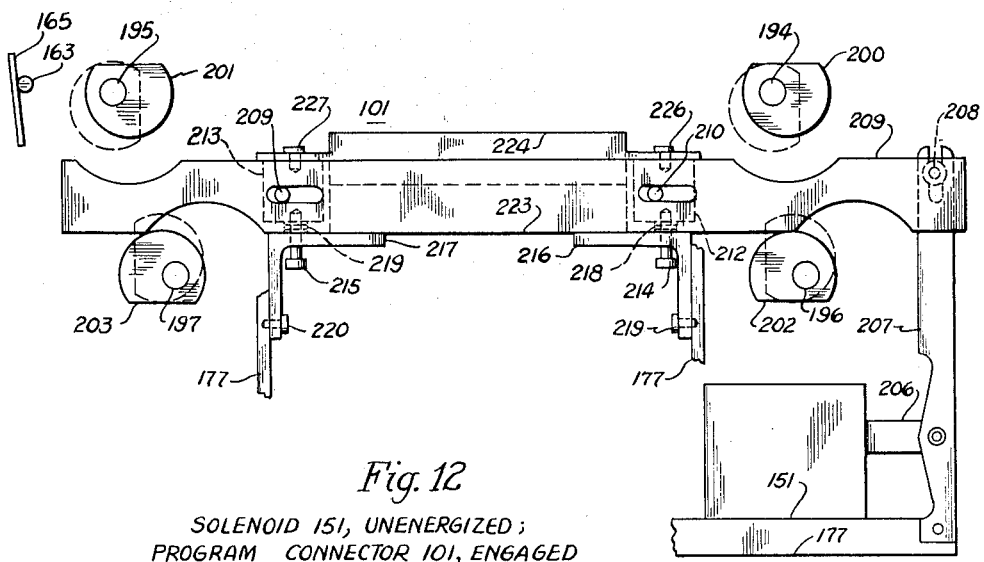

Referring to FIGS. 11 and 12, solenoid 151, mounted on frame 177, has a plunger 206 pivotally connected to arm 207. Arm 207 is pivotally connected to the frame and slidably connected to rod 208 which is positioned between interposers 209. (FIG. 1.) The interposers are slidably mounted on rods 210, 211 which are located in blocks 212, 213. The blocks are positioned between interposers 209 and are each mounted on a respective screw 214, 215 which pass through brackets 216, 217. Each screw is mounted in a respective spring 218, 219 so that the blocks are spring supported. Brackets 216, 217 are fastened to frame 177 by screws 219, 220, respectively.

Program connector 101 comprises female member 223 and male member 224. The latter is mounted on blocks 212, 213 by means of screws 226, 227; the former is mounted on brackets 216, 217 by suitable means, not shown, so that when the male and female members are engaged springs 218, 219 are under compression and when the members are disengaged the springs are in equilibrium.

Similarly, in FIGS. 13 and 14, solenoid 152, mounted on frame 177, has a plunger 230 pivotally connected to arm 231. Arm 231, pivotally attached to the frame, is slidably connected to rod 234 which is located between interposers 235. (FIG. 1.) The interposers are slidably mounted on rods 236, 237, located in blocks 238, 239, which are positioned between the interposers. Each block is mounted on a respective screw 241, 242 which pass through brackets 243, 244 and each screw is mounted in a respective spring 246, 247 so that the blocks are spring mounted. Brackets 243, 244 are fastened to frame 177 by screws 248, 249. Program connector 102 includes female member 250 and male member 251. The latter is mounted on blocks 238, 239 by screws 252, 253; the former is mounted on brackets 243, 244 by suitable means, not shown. Thus, when the male and female members are engaged, springs 246, 247 are under compression and when the members are disengaged the springs are in equilibrium.

Referring to FIG. 1, program connectors 103 to 108 are each positioned between a respective one of interposers 260 to 265 as are rods 266 to 271. The male members of program connectors 103 to 108 are mounted on blocks, not shown, similar to blocks 212, 213 in FIGS. 1, 11 by screws such as 252, 253, FIG. 1, which for simplicity are not illustrated. The blocks are mounted in a manner similar to that shown in FIG. 11 and contain rods on which interposers 260 to 265 are slidably mounted. Solenoids 153 to 158 in FIG. 5 each control a respective one of interposers 260 to 265 with structure essentially the same as disclosed in FIG. 11.

In operation, assume that wiper arm 150 in FIG. 5 is resting on terminal 1, bank III of switch 114, that solenoid 151 is unenergized and program connector 101 is engaged as shown in FIG. 12. When wiper arm 150 moves to terminal 2, as described above, solenoid 152 is energized by way of a circuit that includes contacts 6-1, 5-1. Interposer 235 in FIG. 14, which until this time occupied a position similar to that shown for interposer 209 in FIG. 11, now moves to the left under the control of plunger 230 to occupy the position shown in FIG. 14.

Bar 165 is then rocked from the position shown in FIG. 11 to that shown in FIG. 14, closing contacts 163 of microswitch 164. This completes a circuit from one terminal of A.C. power supply 123 in FIG. 4 through switch 122, when closed, contacts 163, clutch solenoid 170 to the other terminal of the power supply. Clutch solenoid 170 is energized moving plunger 169 to the right in FIG. 15, pivoting latch arm 168 to the right to release L-shaped arm 171. Dog 174 will then drop into one of the notches of disc 181, rotating the L-shaped arm and eccentric arm 173 counterclockwise. As the eccentric arm rotates, sprocket 185 rocks chain 186, which in turn rocks sprockets 190 to 193 so that rods 194 to 197 and cams 200 to 203 rotate back and forth. Cams 202 and 203, as they rotate from their normal to rotated position, engage a portion of interposer 209 in FIG. 12 moving program connector 101 to the disengaged position shown in FIG. 11, while cams 200 and 201 engage interposer 235 to move program connector 102 from the disengaged position in FIG. 14 to the engaged position in FIG. 13. It is readily apparent that if none of the solenoids 151 to 158 had been energized, all of the connectors 101 to 108 would have been disengaged at the termination of the operation.

After program connector 102 is engaged, as L-shaped arm 171 rotates counterclockwise, the arm engages contacts 161 of microswitch 273, momentarily opening the contacts and breaking the holding circuit through coil 6, FIG. 5, de-energizing the coil.

When the male and female members of program connector 102 are engaged, a circuit is completed from one terminal of A.C. power supply 123 through terminals F13, F14 on program card 109, neon tube 310, FIGS. 1, 6, to the other terminal of the power supply. The neon tube lights, indicating that program connector 102 is engaged. Similarly, when each of program connectors 101 and 103 to 108 is engaged, a respective one of neon tubes 309 and 311 to 316 is energized through a pair of the terminals F13, F14 located on the program card 109 associated with the program connector. It is noted that each pair of leads marked F13, F14 in FIG. 6 is connected to a pair of terminals similarly marked on a program card 109 which is located on a respective program connector 101 to 108.

Figure 14A:
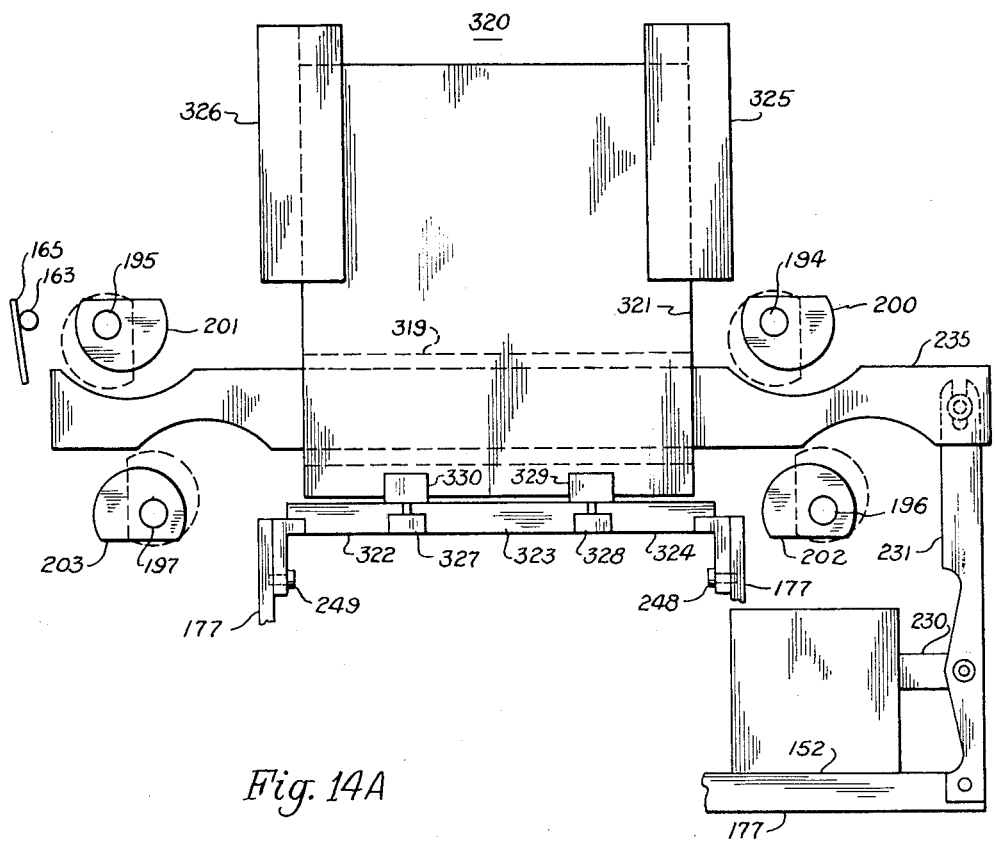

Instead of program connector 102, it is understood that any one of a wide variety of connectors could be used. In FIG. 14A, for example, connector 320 includes male member 321 and female members 322 to 324. The male member, comprising at least one printed circuit board, is attached to member 319 and is positioned between guides 325 and 326. Interposer 235 is slidably mounted in the through member 319. Female members 322 to 324 are mounted on supports 327 and 328 by suitable means, not shown. The female members each comprise a pair of printed circuit boards spaced from each other to form a groove. The various terminals on program card 109 are located in the printed circuits of male member 321 and the circuits that control the different functions of the IBM machine are wired to the printed circuits of female members 322 to 324. Supports 329, 330 are made of spongy material and are located between the male member 321 and female members 322 to 324 so that when solenoid 152 is de-energized the male and female members are held in the disengaged position shown in FIG. 14A. When the male and female members are engaged, an edge of male member 321 is positioned in the groove of female members 322 to 324 in such a manner that corresponding printed circuits on the female members and the edge of the male member are in contact.

AUTOMATIC DUPLICATION

When the male and female member of program connector 102 engage, the program card 109, located on the face of this connector, controls the recording of information in card 275, FIG. 10.

To effect automatic duplication of the information recorded in the first ten columns of card 118 into the first ten columns of card 275, terminal C1 is wired to terminal J8 and terminal C10 is wired to terminal J10 on program card 109.

In operation, positive potential on terminal J8 is applied through contacts 12–5, FIG. 8, diode D17, connector N13 to primary star wheel 0, starting the automatic duplication operation in IBM machine 027. Positive potential applied from terminal J8 through contacts 12–5 energizes relay coil 25P, opening contacts 25–1 to prevent potential from being applied to primary star wheel 7. This is done so that the IBM machine will not receive two instructions simultaneously, namely, one to perform automatic duplication and one to receive information from the key storage unit in the machine when program card 109 is wired for automatic duplication and field size.

To establish field definition for the automatic duplication, positive potential is applied from terminal J8 through contacts 12–5, 13–4, diode D16 and contacts 8–5 to energize relay coil 11H. Contacts 11–3 close to apply potential from the positive terminal of power source 120 through contacts 12–1, 13–1, diode D20, contacts 11–3, connector N9 to the primary star wheel 12, FIG. 8, in the IBM machine 027.

When card 275 is advanced in the IBM machine to column 10, positive potential is applied to terminal J12 in FIG. 8 and through contacts 12–6 to energize relay coil 13P so that contacts 13–1 are opened and relay coil 11H is released. The automatic duplication process is then terminated.

X SKIP AND OVER PUNCH

In certain operations, it may be desired to place a perforation in the first or last column in the X row, located immediately above the O row, of a field to indicate that no information is to be stored in the field.

To provide the second field in card 275 with a perforation in the first column, i.e., column 11 in the X row, the arm of switch 277 in FIG. 6 is positioned to engage the upper contact, terminal C11 is wired to terminal R8 and terminal C18 to U1 on program card 109.

In the first embodiment in FIGS. 6 and 7, when wiper arm 111 of emitter 110 engages terminal 11, corresponding to column 11 of card 275, positive potential is applied through a circuit that includes terminals C11 and R8 to energize relay coils 7LP, 7LT and 16H, closing contacts 16–6. See "Field Size and Recording in a Field," supra. When the operator depresses the subtract key on the IBM machine, a circuit is activated that closes contacts 228–4. This completes a circuit through the contacts, connector M12, switch 277, contacts 16–6, 7–6, connector M14 to secondary star wheel 12 to operate the interposer in the IBM machine for the punch in the X row.

In the second embodiment in FIG. 7D, positive potential is applied through terminal R8, diode D4 and relay coil A17 to the negative terminal of power source 465. Coil A17 is energized and contacts A17–1 close so that when the operator depresses the subtract key and contacts 228–4 close, a circuit is completed between the secondary star wheel common and secondary star wheel 12 to operate the interposer in the IBM machine for the punch in the X row.

To perforate the X row in the last column in this field, the arm of switch 277 is thrown to engage the lower contact. When wiper arm 111 engages terminal 18 of emitter 110, corresponding to column 18, positive potential is applied through terminals 18, C18, U1 and relay coil 12P in FIG. 8, energizing the latter coil to close contacts 12–4. When the operator depresses the subtract bar, closing contacts 228–4, a circuit is completed to secondary star wheel 12, operating the punch that perforates the X row, column 18.

SINGLE-COLUMN DUPLICATION

To record the same information in column 19, card 275 as was recorded in column 19, card 118, terminal C19 is wired to terminal J8 and is also wired to terminal J10.

In operation, positive potential is applied from terminal J8 through contacts 12–5, FIG. 8, and diode D17 to primary star wheel 0. This starts the duplication operation in the IBM machine. However, positive potential, applied to terminal J12, energizes relay coil 13P to open contacts 13–1, 13–4, which prevents the establishment of field definition by relay coil 11H. Thus, automatic duplication is limited to a single column and the information that was recorded in column 19, card 118 is duplicated in column 19, card 275.

To effect automatic skip between columns 20 and 80 on card 275, terminal C20 is wired to terminal J6 on program card 109 and terminal C80 is wired to terminal J10. The operation of the programmer is then the same as that described above for card 118. See "Automatic Skip," supra.

To effect high-speed skip between columns 21 and 75 on card 275, terminal C21 is wired to terminal J2 and terminal C75 to the terminal J4. The operation of the programmer is then the same as that described above in connection with card 118. See "High-Speed Skip," supra.

PROGRAM SELECTION

Unless instructed otherwise, the programmer will sequentially engage connectors 101 to 108, FIG. 1, to control the recording of information in eight different card types. However, since in this case only two cards are to be punched, it is desired to re-engage program connector 101 after program connector 102 has been engaged. To accomplish this, terminal C81 on the program card 109, located on program connector 102, is wired to terminal F9 while terminal F10 is wired to terminal F1.

In operation, positive potential is applied to terminal F9 energize relay coil 15LP (FIG. 9). Contacts 15–2 close to energize relay 5; hence, contacts 5–1 open so that none of the solenoids 151 to 158 can be operated before wiper arm 150 engages the proper terminal 1 to 8 in bank III, switch 114. Contacts 5–1 close completing a circuit from one terminal of D.C. power supply 124 through interrupter contacts 276 in FIG. 5, which are controlled by coil 1, contacts 15–1, 17–2, 18–2 and coil 1 to the other terminal of the power supply. Coil 1 is energized and stepper switch 114 is advanced until contacts 15–1 are opened.

Since terminal F10 is connected to terminal F1, when wiper arm 215 engages terminal 10, bank IV of switch 114, a circuit is completed from one terminal of D.C. power supply 124 through relay 15LT in FIG. 5, terminals F10, F1, 10, wiper arm 215, the lower contacts of interrupter contacts 276, when closed, to the other terminal of D.C. power supply 124. Since the lower contacts of 276 are closed during the time that the wiper arm engages terminal 10, relay coil 15LT is energized, contacts 15–1 open to break the circuit through coil 1, and contacts 15–2 open to de-energize relay 5. Capacitor 278 and resistor 279, connected across coil 15LT, form an arc suppression circuit.

Relay coils 10P, 9P and relay 6 are then energized in the manner indicated above to complete circuits that activate solenoid 151. When solenoid 151 is energized, program connector 102 is released and connector 101 is engaged. See "Automatic/Manual Program Changing," supra.

HOLD PROGRAM

There will be times when it will be desired to use the same one of program connectors 101 to 108 several times in succession, but the exact number of times will not be known in advance. Under these circumstances, program card 109 is wired for "hold program." The same program connector can then be used continually until key 280 in FIG. 9 is depressed.

To achieve this result, terminal C81 in program card 109 is wired to the terminal F11.

The structure in dotted rectangle 281 in FIG. 9, located in IBM machine 027, is modified so that diode D18 is connected between key 280, which normally latches when depressed, and the pick coil of relay 41. Potential is applied from the positive terminal of power supply 120 through the key, when depressed, and diode D18 to the pick coil of relay 41, releasing the latching mechanism for the key.

In operation, positive potential is applied to terminal F11, energizing relay coil 17LP. (FIG. 9.) This opens contacts 17–1 so that relay 6 will not be energized. Contacts 17–2 open, breaking the circuit through coil 1 to prevent wiper arm 215 on bank IV, switch 114 from advancing. Thus, the program connector 101 to 108 that is engaged will remain engaged until relay coil 17LP is released. Contacts 17–3 are closed to complete a circuit through neon tube 282 in FIG. 6 which lights, indicating the repeat function is in operation.

To end this operation, key 280 is depressed completing a circuit through connector S5 and relay coil 17LT which is energized, releasing the contacts controlled by relay 17LP.

MANUAL OPERATION

When the programmer is in automatic operation, the armature of relay coil 21LP in FIG. 9 is latched, contacts 21–3 are closed, contacts 21–4 are open. When key 140 is depressed, placing the programmer in manual operation, relay coil 21LT is energized and the contacts controlled by the armature of coil 21LP are released. Contacts 21–2 in FIG. 4 are opened so that coils 1 and 6 cannot be energized. The movable arm of contacts 21–1 is moved to the position shown in FIG. 6 to complete a circuit across A.C. power supply 123 to energize neon tube 138. This indicates the programmer is in manual operation.

The operator can now use the program connector 101 to 108 that is engaged or change to another by depressing one of the knobs 285 to 292. (FIG. 5.) Each of these knobs controls a pair of movable arms in a switch comprising one contact in each set of contacts 1B to 8B, 1C to 8C, and 1D to 8D. All the upper contacts of each set are connected in series as are the lower contacts of sets 1C to 8C and 1B to 8B. Each of the lower contacts of set 1C to 8C is located on one movable arm of a switch back to back with a respective upper contact of set 1D to 8D, while each of the lower contacts of sets 1B to 8B is located on the other movable arm of a switch. Each of the lower contacts of set 1D to 8D is connected to a respective one of terminals 1 to 8 on bank II, switch 114. Wiper arm 293 is connected to the upper contacts of set 1B to 8B.

One of the switches described immediately above is shown in detail in FIG. 4A. It is noted that movable arms 297, 299 are controlled by knob 285 and that the lower contact of set 1B is mounted on arm 299, while the lower contact of set 1C and the upper contact of set 1D are mounted back to back on arm 297. For simplicity, the movable arms associated with each switch in FIG. 4 are not numbered.

As an example of operation, assume that wiper arm 293 is resting on terminal 2 and that knob 285 is depressed. Contacts 1B, 1C are then closed and contacts 1D are opened. A circuit is completed from one terminal of D.C. power supply 124 through coil 1, contacts 18–2, 17–2, 1B, wiper arm 293, contacts 2D, interrupter contacts 276 to the other terminal of the D.C. power supply. Wiper arm 293 will then sweep through contacts 2 to 8.

Thereafter, wiper arm 294, bank I of switch 114 engages terminal 9 completing a circuit from one side of D.C. power supply 124 through coil 1, contacts 18-2, 17-1, terminal 9, wiper arm 294, interrupter contacts 276 to the other side of the power supply. Stepper switch 114 advances until wiper arm 293 engages terminal 1, bank II of switch 114 when the circuit through coil 1 is broken because as indicated above contacts 1D are open. Wiper arm 293 comes to rest on terminal 1 and wiper arm 150 comes to rest on terminal 1, bank III of switch 114.

When knob 285 is depressed, relay 4 is energized through an obvious circuit that includes resistor 295. Capacitor 296, connected across relay 4, functions with resistor 295 to provide the relay with a desired delay so that it will not be energized until wiper arm 150 comes to rest on terminal 1. When the relay is energized, contacts 4-1 close, completing a circuit that activates solenoid 151, thereby engaging program connector 101 as described above under "Automatic/Manual Program Changing."

REPEAT PROGRAM

Repeat key 298 in FIG. 9 is depressed when the operator, realizing a mistake has been made in punching a card, desires to use the same program connector 101 to 108 again to control the next card. When this key is depressed, relay coil 18LP is energized. Contacts 18-1 close, completing a circuit that energizes neon tube 282, the repeat indicator light in FIG. 6. Contacts 18-2 open, preventing coil 1, FIG. 4, from being energized so that stepper switch 114 cannot advance to engage another program connector 101 to 108. Contacts 18-3 open, preventing relay 6 from being energized so that none of the solenoids 151 to 158 can be energized to release the program connector 101 to 108 that is engaged. The movable arm of contacts 18-4 engages the fixed contact to the left in FIG. 9 to complete a circuit from the negative terminal of power supply 120 through relay coil 18LT, capacitor 300, FIG. 9, contacts 18-4, terminals $$\frac{4}{5B}$$

$$\frac{4}{12A}$$

and connector A3 to terminal 1 of emitter 110. When wiper arm 111 engages terminal 1, a circuit is completed to the common primary star wheel through the wiper arm and contacts 6-2. Relay coil 18LT is then energized by current flowing through capacitor 300, which prevents positive potential from being applied to coil 18LT for too long a period. When coil 18LT is energized, relay coil 18LP is released, terminating the repeat operation, and the movable arm of contacts 18-4 moves to the right in FIG. 9 to engage the fixed contact, discharging capacitor 300.

TO CLEAR THE PROGRAMMER

To clear the programmer, clear key 301 in FIG. 4 is depressed closing contacts 302 which connect source of positive potential 303 through contacts 302, terminals $$\frac{1}{12A}$$

$$\frac{1}{0B}$$

relay coils 20P and 24P, the latter coils connected in parallel, to the negative terminal of power source 120. Relay coils 20P, 24P are then energized.

Contacts 20-1, 20-2, 20-3 and 20-4 close to activate relay coils 15LT, 17LT, 18LT and 19LT, releasing any of the armatures associated with these relays that may have been left latched at the termination of the last operation.

Contacts 24-1 close to complete a circuit through neon tube 305, indicating that the programmer is in the clear position. Contacts 24-2 open, preventing relay coil 9P from being energized. Contacts 24-3 close so that when one of knobs 285 to 292 is depressed a circuit is completed from one side of D.C. power supply 124 through relay 24LT, contacts 24-3, resistor 306, interrupter contacts 276 to the other side of the power supply. Coil 24LT is then energized; coil 24LP released, and the programmer is no longer in the clear position. Contacts 24-4 close to complete a circuit between N/C (normally closed) contacts 26-1 in the IBM machine, connector T2, FIG. 8, contacts 24-4, connector S15 to the hold coil of relay 26 in the machine. This places the hold coil of relay 26 back in operation as required when the programmer is in the clear position and the IBM machine is to be controlled by its own program card.

When key 301 is depressed, contacts 304 close and clutch solenoid 170 in FIG. 15 is activated. Since relay coil 24LP is energized, contacts 24-2 are open and coil 9P cannot be energized to complete a circuit through relay 6. Consequently, none of the solenoids 151 to 158 can be operated and all of the program connectors 101 to 108 are released as described above. See "Automatic/Manual Program Changing," supra.

When one of the knobs 285 to 292 is depressed, relay 24LT is activated, relay 24LP is released and the program connector 101 to 108 associated with the depressed knob is engaged. The programmer is thus released from the clear position.

Since the present inventive concept could obviously be used in programming a wide variety of machines, it is understood that the embodiment described is intended merely as an illustration and that within the scope of the appended claims the invention may be practiced otherwise than as specifically described.

What is claimed is:

1. In a programmer, means for selecting one of a plurality of program connectors, each having a male and female member, comprising: an emitter including a plurality of first terminals, means for applying a potential sequentially to each of said first terminals, a plurality of second terminals, stepping means for applying a potential sequentially to said second terminals, means connected to at least one of said first terminals and responsive to a potential for advancing said stepping means, and means connected to each of said second terminals and responsive to a potential for effecting the engagement of the female and male member of a respective one of said program connectors.

2. In a programmer, means for selecting one of a plurality of program connectors each having a male and female member comprising: an emitter including a plurality of first terminals, means for sequentially applying a potential to each of said first terminals, a plurality of second terminals, a potential source, stepping means including a time delay circuit for sequentially applying said potential source to selected ones of said second terminals, means connected to at least one of said first terminals and responsive to a potential for advancing said stepping means and for activating said delay circuit until said stepping means has advanced to a selected second terminal, and means connected to each of said second terminals and responsive to a potential for effecting the engagement of the female and male member of a respective one of said program connectors.

3. In a programmer, means for selecting one of a plurality of program connectors, each having a male and a female member, comprising: an emitter including a plurality of first terminals, means for applying potential sequentially to each of said first terminals, stepping means including a coil, wiper arm and a plurality of second terminals, means connected to at least one of said first terminals for energizing said coil, a source of potential, a normally-open circuit connected between said source of potential and said wiper arm, means for opening said circuit during a period occurring at a selected time interval after potential is applied to said coil, a source of pulses, control means responsive to a pulse from said last-mentioned source for closing said circuit for a selected period occurring after potential is applied to said coil, and means connected to each of said second terminals and responsive to a potential for effecting the engagement of the female and male member of a respective one of said program connectors.

4. In combination, at least one interposer slidably mounted for movement in a first and second direction, said interposer having a first and second position located along said first direction and a third and a fourth position located along said second direction, means for moving said interposer between said first and second position, at least a first and second cam, each having a normal and a rotated position, said first cam being positioned so that in rotating from the normal to rotated position its surface engages a surface of said interposer in the first position, whereby said interposer is moved from said third to said fourth position, and said second cam being positioned so that in rotating from the normal to rotated position its surface engages a surface of said interposer in said second position, whereby said interposer is moved from said fourth to said third position.

5. The combination set forth in claim 4 including a fixed element and a connector having a male and female member, said male member being positioned on said interposer and said female member being positioned on said fixed element so that the male member engages the female member when said interposer is in said fourth position.

6. In combination, a fixed element, a block of material, means including a spring for mounting said block on said fixed element, at least one interposer slidably mounted on said block for movement in a selected direction, said interposer having a first and second position located along the selected direction, means for moving said interposer between said first and second position, at least a first and second cam, said first cam being positioned so that in rotating from the normal to rotated position its surface engages a surface of said interposer in the first position, whereby said spring is placed under compression, and said second cam being positioned so that in rotating from the normal to rotated position its surface engages a surface of said interposer in said second position, whereby said spring is placed in equilibrium.

7. The combination set forth in claim 6 including a connector having a male and a female member, said male member being positioned on said interposer and said female member being positioned on said fixed element so that the male member engages the female member when said spring is under compression.

8. In combination, a program connector having a male and female member, said male member comprising at least one printed circuit board, said female member comprising at least a pair of printed circuit boards spaced from each other to form a groove, said groove having dimensions such that when the male and female member engage the edge of said male member and the sides of said groove are in contact, resilient material positioned between said male and female member, an interposer slidably mounted on said male member for movement in a selected direction, said interposer having a first and second position located along the selected direction, means for moving said interposer between said first and second position, at least a first and second cam, said first cam being positioned so that in rotating from the normal to rotated position its surface engages a surface of said interposer in the first position, whereby said resilient material is placed under compression and said male and female member are engaged, and said second cam being positioned so that in rotating from the normal to rotated position its surface engages a surface of said interposer in said second position, whereby said resilient material is placed in equilibrium and said male and female member are disengaged.

9. In combination, a plurality of interposers, each slidably mounted for movement in a first and second direction, each interposer having a first and second position along said first direction and a third and fourth position along said second direction, at least a first and second cam, each having a normal and a rotated position, said first cam being positioned so that in rotating from the normal to rotated position its surface engages a surface of each interposer in said second position, whereby said interposer is moved from said third to said fourth position, said second cam being positioned so that in rotating from the normal to rotated position its surface engages a surface of each interposer in said second position, whereby each interposer is moved from said fourth to said third position, a stepping means including a plurality of terminals, means for applying a potential to each of said terminals, and means responsive to a potential on each of said terminals for moving a respective one of said interposers between the first and second position and for rotating said first and second cam at least once between its normal and rotated position.

10. In a programmer, means for establishing read-out start comprising: an emitter including a plurality of first terminals, means for applying a potential sequentially to each of said first terminals, a program card having a plurality of column exit terminals and a plurality of read-out start terminals, means for connecting each of said first terminals to a respective one of said exit terminals, means for connecting any one of said exit terminals to a respective one of said start terminals, stepping means including a plurality of third terminals, each connected to a respective one of said start terminals, each third terminal corresponding to a step in said stepping means, and means responsive to a potential appearing on any one of said third terminals for advancing said stepping means to the step corresponding to the third terminal following the one on which said potential appears.

11. In the programmer set forth in claim 10, means for establishing a single-column field comprising: means responsive to a potential and connected to one of said third terminals for preventing the advancement of said stepping means.

12. In a programmer, means for establishing read-out start comprising: an emitter including a plurality of first terminals, means for applying a potential sequentially to each of said first terminals, a program card having a plurality of column exit terminals and a plurality of read-out start terminals, means for connecting each of said first terminals to a respective one of said exit terminals, means for connecting any one of said exit terminals to a respective one of said start terminals, stepping means including a plurality of third terminals, each connected to a respective one of said start terminals, each third terminal corresponding to a step in said stepping means, and means responsive to a potential appearing on any one of said third terminals for advancing said stepping means to the step corresponding to the third terminal on which said potential appears.

13. In a programmer, means for establishing field size comprising: an emitter including a plurality of first terminals, means for applying potential sequentially to each of said first terminals, a program card having a plurality of column exit terminals arranged in a desired sequence, a plurality of field size terminals and at least one read-out end terminal, means for connecting each of said first terminals to a respective one of said exit terminals, means for connecting a first one of said exit terminals to a respective one of said field size terminals and a second one of said exit terminals to said read-out end terminal, the second exit terminal occurring in said sequence after said first exit terminal, stepping means including a plurality of second terminals, each connected to a respective one of said field size terminals, a source of potential, a connector, means responsive to the positioning of said stepping means at a desired step for applying said source of potential to said connector, and means responsive to a potential applied to said read-out end terminal for preventing the application of said potential source to said connector.

14. In a programmer, means for selecting one of a plurality of program connectors, each having a male and female member, comprising: an emitter including a plurality of first terminals, means for applying a potential sequentially to each of said first terminals, a plurality of program cards, each located on a respective one of said program connectors and each having a plurality of first selection terminals and a second selection terminal, a third selection terminal connected to at least one of said first terminals, means for connecting a selected one of said first selection terminals to said second selection terminal, a source of potential, stepping means including a plurality of third and fourth terminals and means for applying said source of potential to a selected one of said third terminals in dependency upon the position of said stepping means, each third terminal being associated with a respective fourth terminal and a respective program connector, means for connecting each fourth terminal to a respective one of said first selection terminals, means connected to the second and third selection terminal for advancing said stepping means to a selected position, whereby potential is applied to a desired one of said third terminals, and means connected to each of said third terminals and responsive to a potential for effecting the engagement of the male and female member of a respective one of said program connectors.

15. In a programmer, means for maintaining the selection of one of a plurality of connectors, each having a male and a female member, comprising: an emitter including a plurality of first terminals, means for applying a potential sequentially to each of said first terminals, a plurality of second terminals, means responsive to a potential and connected to said second terminals for effecting the engagement of the male and female member of a respective one of said program connectors, stepping means including means for applying potential to a selected one of said second terminals, a plurality of program cards, each located on a respective one of said program connectors and each having at least a hold program terminal, means for connecting at least one of said first terminals to said hold program terminal, means connected to said hold program terminal and responsive to a potential for preventing the advancement of said stepping means, and means for disabling said last-mentioned means.

16. In a programmer, means for selecting a desired one of a plurality of program connectors, each having a male and female member, comprising: a plurality of switches, each having a first, second and third fixed contact, a fourth and fifth contact mounted back-to-back on a movable arm, a sixth contact mounted on another movable arm and means for controlling the movable arms manually, said first and fourth contacts forming a pair of normally-open contacts, said fifth and second contacts forming a pair of normally-closed contacts and said sixth and third contacts forming a pair of normally-open contacts, stepping means including a coil, interrupter contacts and a first an second wiper arm positioned to sweep a plurality of first and second terminals, respectively, means connecting each of said first terminals to a respective one of said second contacts, means connecting the third contact of each switch to said first wiper arm, a first potential source having a third and fourth terminal, means connecting the fourth contact of each switch and said interrupter contacts in a series circuit tied to said third terminal, means connecting the sixth contact of each switch and said coil in a series circuit tied to said fourth terminal, a second potential source tied to said second wiper arm, and means connected to each of said second terminals and responsive to a potential for effecting the engagement of the female and male member of a respective one of said program connectors.

17. In a programmer, means for maintaining the selection of one of a plurality of connectors, each having a male and a female member, comprising: an emitter including a plurality of first terminals, means for applying a potential sequentially to each of said first terminals, a plurality of second terminals, stepping means for applying a potential sequentially to selected ones of the second terminals, means connected to each of said second terminals and responsive to a potential for effecting engagement of the female and male member of a respective one of said program connectors, means connected to at least one of said first terminals and responsive to a potential for advancing said stepping means, a repeat key, and means responsive to the operation of said repeat key for disabling said last-mentioned means.

18. In combination, a plurality of interposers, each slidably mounted for movement in a first and second direction, each interposer having a first and second position along said first direction and a third and fourth position along said second direction, at least a first and second cam, each having a normal and a rotated position, said first cam being positioned so that in rotating from the normal to rotated position its surface engages a surface of each interposer in said second position, whereby said interposer is moved from said third to said fourth position, said second cam being positioned so that in rotating from the normal to rotated position its surface engages a surface of each interposer in said second position, whereby each interposer is moved from said fourth to said third position.

19. The combination set forth in claim 18 including a plurality of program connectors, each having a male and female member, each male member being positioned on at least one of said interposers, a fixed element, each female member being positioned on said fixed element in such a manner that the female member and a respective male member engage when the interposer associated with the male member is in said fourth position.

20. The combination set forth in claim 19 including stepping means comprising a plurality of terminals, means for applying a potential to each of said terminals, and means responsive to a potential on each of said terminals for moving a respective one of said interposers between the first and second position and for rotating said first and second cam at least once between its normal and rotated position.

21. The combination set forth in claim 18 including an emitter comprising a plurality of first terminals, means for applying a potential sequentially to each of said first terminals, a plurality of second terminals, stepping means for applying a potential sequentially to said second terminals, means connected to at least one of said first terminals and responsive to a potential for advancing said stepping means, and means responsive to a potential on each of said second terminals for moving a respective one of said interposers between the first and second position and for rotating said first and second cam at least once between its normal and rotated position.

22. The combination set forth in claim 19 including an emitter comprising a plurality of first terminals, means for sequentially applying a potential to each of said first terminals, a plurality of second terminals, a potential source, stepping means including a time delay circuit for sequentially applying said potential source to selected ones of said second terminals, means connected to at least one of said first terminals and responsive to a potential for advancing said stepping means and for activating said delay circuit until said stepping means has advanced to a selected second terminal, and means responsive to a potential on each of said second terminals for moving a respective one of said interposers between the first and second position and for rotating said first and second cam at least once between its normal and rotated position.

23. The combination set forth in claim 19 including a plurality of first terminals, means for applying a potential sequentially to each of said first terminals, a plurality of program cards, each located on a respective one of said program connectors and each having a plurality of first and second selection terminals and a third selection terminal connected to one of said first terminals, means for connecting a selected one of said first selection terminals to a respective second selection terminal, a source of potential, stepping means including a plurality of third and fourth terminals, means for applying said source of potential to a selected one of said third terminals in dependency upon the position of said stepping means, each third terminal being associated with a respective fourth terminal and a respective program connector, means for connecting each fourth terminal to a respective one of said first selection terminals, means connected to the second and third selection terminals for advancing said stepping means to a selected position, whereby potential is applied to a selected one of said third terminals, and means responsive to a potential on each of said third terminals for moving a respective one of said interposers between the first and second position and for rotating said first and second cam at least once between its normal and rotated position.

24. The programmer set forth in claim 10 wherein said stepping means comprises a stepper switch having a wiper arm positioned to sense said third terminals, normally open contacts, and means responsive to energization of said stepper coil for advancing said arm and for closing said last-mentioned contacts, a relay controlling first, second and third contacts, said first and second contacts being normally open and said third contacts being normally closed, a latch-pick and a latch-trip coil controlling fourth and fifth contacts, said fourth contacts being normally closed and said fifth contacts being normally open, a plurality of diodes, each connected in the same polarity between a respective one of said third terminals and the movable arm of said first contacts, the fixed arm of said first contacts being tied to one of said fourth contacts, a potential source connected to one side of said relay, said second and fifth contacts being tied in parallel between the movable arm of said first contacts and the other side of said relay, said third contact and said latch-pick coil being connected in series between the movable arm of said first contacts and said source, the contacts of said stepper switch and said latch-trip coil being tied in series between said wiper arm and said source, and means responsive to energization of said relay and latch-pick coil for energizing the coil of said stepper switch.

25. The programmer set forth in claim 12 wherein said stepping means comprises a plurality of thyratrons, each having a control grid coupled to a respective one of said third terminals and a plate coupled to a common conductor, a plurality of relays, each positioned in the plate circuit of a respective one of said thyratrons, each relay controlling a set of first and a set of second contacts, each set comprising a transferred contact, a normal contact and an armature, the sets of first contacts being connected in series in such a manner that each transferred contact, except the last one, is tied to the armature of another set, the normal contact of each set of first contacts being connected to a control grid of a respective thyratron other than the one associated with its relay, the last transferred contact in the series of first contacts being connected to the control grid of the thyratron associated with its relay, the second sets of contacts being connected in series in such a manner that each transferred contact, except the last one, is tied to a respective one of the armatures in another set, a first pulse source connected to the armature of the first set in the series of first contacts, a second pulse source connected to the armature of the first set in the series of second contacts, a plurality of connectors, each tied to a respective normal contact in said series of second contacts, and a connector tied to the last transferred contact in said second series of contacts.

References Cited by the Examiner
UNITED STATES PATENTS

| | | | |
|---|---|---|---|
| 2,755,860 | 7/56 | Dreher et al. | 234—15 |
| 2,813,986 | 11/57 | Dickinson et al. | 307—115 |
| 2,905,244 | 9/59 | Sonnanstine | 234—13 |
| 2,964,743 | 12/60 | Bange | 234—15 |
| 3,023,952 | 3/62 | Thomas | 234—13 |
| 3,045,130 | 7/62 | Bashor et al. | 307—115 |
| 3,090,844 | 5/63 | Streu | 307—115 |

ANDREW R. JUHASZ, *Primary Examiner.*

FRANK H. BRONAUGH, *Examiner.*